US010085124B2

United States Patent
Patel et al.

(10) Patent No.: US 10,085,124 B2
(45) Date of Patent: Sep. 25, 2018

(54) SYSTEM AND METHOD TO LEVERAGE WEB REAL-TIME COMMUNICATION FOR IMPLEMENTING PUSH-TO-TALK SOLUTIONS

(71) Applicant: Kodiak Networks Inc., Plano, TX (US)

(72) Inventors: Krishnakant M. Patel, Richardson, TX (US); Bibhudatta Biswal, Richardson, TX (US); Harisha M. Negalaguli, Richardson, TX (US); Ramu Kandula, Plano, TX (US); Brahmananda R. Vempati, Dallas, TX (US); Ravi Ayyasamy, Richardson, TX (US); Gorachand Kundu, Bangalore (IN); Ravi Ganesh Ramamoorthy, Bangalore (IN); Rajendra Kumar Anthony, Bangalore (IN)

(73) Assignee: KODIAK NETWORKS INC., Plano, TX (US)

( * ) Notice: Subject to any disclaimer, the term of this patent is extended or adjusted under 35 U.S.C. 154(b) by 0 days.

(21) Appl. No.: 15/581,618

(22) Filed: Apr. 28, 2017

(65) Prior Publication Data
US 2017/0295475 A1 Oct. 12, 2017

Related U.S. Application Data

(63) Continuation of application No. PCT/US2015/058088, filed on Oct. 29, 2015.

(60) Provisional application No. 62/117,575, filed on Feb. 18, 2015, provisional application No. 62/072,135, filed on Oct. 29, 2014.

(51) Int. Cl.
H04W 4/10 (2009.01)
H04L 29/06 (2006.01)
H04L 29/08 (2006.01)

(52) U.S. Cl.
CPC ............ *H04W 4/10* (2013.01); *H04L 65/1006* (2013.01); *H04L 65/1069* (2013.01); *H04L 65/4061* (2013.01); *H04L 67/02* (2013.01)

(58) Field of Classification Search
CPC .. H04W 4/10; H04L 65/1006; H04L 65/1069; H04L 65/4061
USPC ......................................................... 455/518
See application file for complete search history.

(56) References Cited

U.S. PATENT DOCUMENTS

| | | | | |
|---|---|---|---|---|
| 6,115,580 | A * | 9/2000 | Chuprun | H04W 4/04 455/1 |
| 7,694,150 | B1 * | 4/2010 | Kirby | G06F 21/55 713/188 |
| 7,774,011 | B2 * | 8/2010 | Sung | H04W 4/10 455/518 |
| 7,941,551 | B2 * | 5/2011 | Anantharaman | H04L 29/12528 709/227 |
| 8,121,114 | B2 * | 2/2012 | Rosenberg | H04M 3/436 370/352 |

(Continued)

*Primary Examiner* — Hai V Nguyen

(57) ABSTRACT

A system and method to leverage Web Real-Time Communication (WebRTC) for implementing Push-to-Talk (PTT) solutions. One or more servers interface to a communications network to perform advanced voice services for one or more wireless or wired user devices, wherein the advanced voice services include a two-way half-duplex voice call within a group of the user devices comprising a PTT call session. At least one of the user devices communicates with at least one of the servers during the PTT call session using a WebRTC connection, and at least the media streams for the PTT call session are transmitted between the server and the user device using the WebRTC connection.

20 Claims, 19 Drawing Sheets

(56) References Cited

U.S. PATENT DOCUMENTS

| | | | |
|---|---|---|---|
| 8,165,091 B2* | 4/2012 | Nix | H04L 29/125 370/331 |
| 8,175,010 B2* | 5/2012 | Sung | H04W 4/10 370/260 |
| 8,185,660 B2* | 5/2012 | Perumal | H04L 29/12528 709/245 |
| 8,228,861 B1* | 7/2012 | Nix | H04W 36/00 370/329 |
| 8,312,169 B2* | 11/2012 | Perumal | H04L 29/12528 709/238 |
| 8,356,344 B2* | 1/2013 | Lin | H04L 29/12424 726/11 |
| 8,432,896 B2* | 4/2013 | Foster | H04L 29/12009 370/260 |
| 8,601,144 B1* | 12/2013 | Ryner | G06F 21/45 709/228 |
| 8,639,844 B2* | 1/2014 | Kumarasamy | H04L 65/105 709/239 |
| 8,724,874 B2* | 5/2014 | Wein | G06T 7/33 382/131 |
| 8,725,885 B1* | 5/2014 | Ryner | G06F 21/45 709/228 |
| 8,917,311 B1* | 12/2014 | Yang | H04L 65/1069 348/14.01 |
| 8,918,132 B2* | 12/2014 | Kim | H04W 76/005 455/518 |
| 9,088,876 B2* | 7/2015 | Patel | H04W 4/10 |
| 9,131,112 B1* | 9/2015 | Anderson | H04N 7/152 |
| 9,137,187 B1* | 9/2015 | Goepp | H04L 51/12 |
| 9,137,646 B2* | 9/2015 | Kundu | H04W 4/10 |
| 9,307,041 B2* | 4/2016 | Santhanam | H04L 67/141 |
| 9,357,359 B2* | 5/2016 | Mandyam | H04L 65/4061 |
| 9,510,165 B2* | 11/2016 | Patel | H04W 4/10 |
| 9,515,995 B2* | 12/2016 | Wang | H04L 61/2589 |
| 9,578,180 B2* | 2/2017 | Chen | H04M 7/006 |
| 9,596,272 B2* | 3/2017 | Gunnalan | H04L 65/1069 |
| 9,668,166 B2* | 5/2017 | Santhanam | H04W 28/0268 |
| 9,681,275 B2* | 6/2017 | Park | H04W 4/10 |
| 9,781,167 B2* | 10/2017 | Gaviria | H04L 65/1016 |
| 9,883,357 B2* | 1/2018 | Kundu | H04W 4/10 |
| 2007/0076660 A1* | 4/2007 | Sung | H04W 4/10 370/329 |
| 2007/0091848 A1* | 4/2007 | Karia | H04L 29/06027 370/331 |
| 2007/0112914 A1* | 5/2007 | Sung | H04W 4/10 709/205 |
| 2007/0121526 A1* | 5/2007 | Sung | H04W 4/10 370/252 |
| 2008/0003999 A1* | 1/2008 | Sung | H04W 28/18 455/422.1 |
| 2008/0009281 A1* | 1/2008 | Sung | H04L 65/4038 455/426.1 |
| 2008/0076403 A1* | 3/2008 | Park | H04W 4/10 455/422.1 |
| 2008/0304419 A1* | 12/2008 | Cooper | H04L 29/125 370/248 |
| 2009/0059848 A1* | 3/2009 | Khetawat | H04L 29/12367 370/328 |
| 2009/0097477 A1* | 4/2009 | Zhu | H04L 12/2861 370/352 |
| 2009/0147772 A1* | 6/2009 | Rao | H04L 12/1818 370/352 |
| 2009/0170557 A1* | 7/2009 | Chauhan | H04W 36/14 455/552.1 |
| 2009/0215438 A1* | 8/2009 | Mittal | H04M 3/42195 455/418 |
| 2009/0222429 A1* | 9/2009 | Aizenbud-Reshef | G06F 8/36 |
| 2010/0027418 A1* | 2/2010 | Rodrig | H04L 41/147 370/235 |
| 2010/0165976 A1* | 7/2010 | Khan | H04M 3/42263 370/352 |
| 2010/0202439 A1* | 8/2010 | Rosenberg | H04M 3/436 370/352 |
| 2010/0205653 A1* | 8/2010 | Eronen | H04L 29/12509 726/3 |
| 2010/0217874 A1* | 8/2010 | Anantharaman | H04L 29/12528 709/228 |
| 2010/0290685 A1* | 11/2010 | Wein | G06T 7/33 382/131 |
| 2010/0293297 A1* | 11/2010 | Perumal | H04L 29/12528 709/245 |
| 2011/0092172 A1* | 4/2011 | Stille | H04W 76/45 455/90.2 |
| 2011/0208802 A1* | 8/2011 | Gunnalan | H04L 41/0893 709/203 |
| 2011/0294494 A1* | 12/2011 | Vempati | H04Q 3/0029 455/422.1 |
| 2012/0047270 A1* | 2/2012 | Chandrasekaran | H04L 41/12 709/227 |
| 2012/0115530 A1* | 5/2012 | Kim | H04W 76/005 455/518 |
| 2013/0155875 A1* | 6/2013 | Ayyasamy | H04W 76/005 370/242 |
| 2013/0185440 A1* | 7/2013 | Blau | H04L 61/2589 709/227 |
| 2013/0196706 A1* | 8/2013 | Patel | H04W 4/10 455/518 |
| 2014/0082217 A1* | 3/2014 | Lohner | H04L 61/2007 709/245 |
| 2014/0148210 A1* | 5/2014 | Kundu | H04W 4/10 455/518 |
| 2014/0150075 A1* | 5/2014 | Ryner | G06F 21/45 726/5 |
| 2014/0219083 A1* | 8/2014 | Mandyam | H04L 65/4061 370/230 |
| 2014/0219167 A1* | 8/2014 | Santhanam | H04W 28/0268 370/328 |
| 2014/0222890 A1 | 8/2014 | Zhu et al. | |
| 2014/0223452 A1* | 8/2014 | Santhanam | G06F 9/541 719/328 |
| 2014/0379931 A1* | 12/2014 | Gaviria | H04L 65/1016 709/227 |
| 2015/0026473 A1* | 1/2015 | Johnston | H04L 63/126 713/171 |
| 2015/0039760 A1* | 2/2015 | Yoakum | H04L 65/1059 709/225 |
| 2015/0078295 A1* | 3/2015 | Mandyam | H04L 65/1003 370/329 |
| 2015/0113588 A1* | 4/2015 | Wing | H04L 63/0227 726/1 |
| 2015/0188882 A1* | 7/2015 | Wang | H04L 61/2589 370/352 |
| 2015/0256984 A1* | 9/2015 | Patel | H04W 4/10 455/416 |
| 2015/0281170 A1* | 10/2015 | Patel | H04W 4/10 370/260 |
| 2015/0281642 A1* | 10/2015 | Yang | H04L 65/1069 348/14.01 |
| 2016/0050229 A1* | 2/2016 | Patel | H04L 63/1458 726/23 |
| 2016/0094586 A1* | 3/2016 | Gunnalan | H04L 45/123 709/228 |
| 2016/0094589 A1* | 3/2016 | Gunnalan | H04L 65/1069 709/227 |
| 2016/0094591 A1* | 3/2016 | Moore | H04L 65/1006 709/228 |
| 2016/0157066 A1* | 6/2016 | Kundu | H04W 4/08 455/416 |
| 2016/0226937 A1* | 8/2016 | Patel | H04L 65/4061 |
| 2016/0380967 A1* | 12/2016 | Moore | H04L 65/1069 709/217 |
| 2017/0237600 A1* | 8/2017 | Patel | H04L 29/08693 455/452.2 |

* cited by examiner

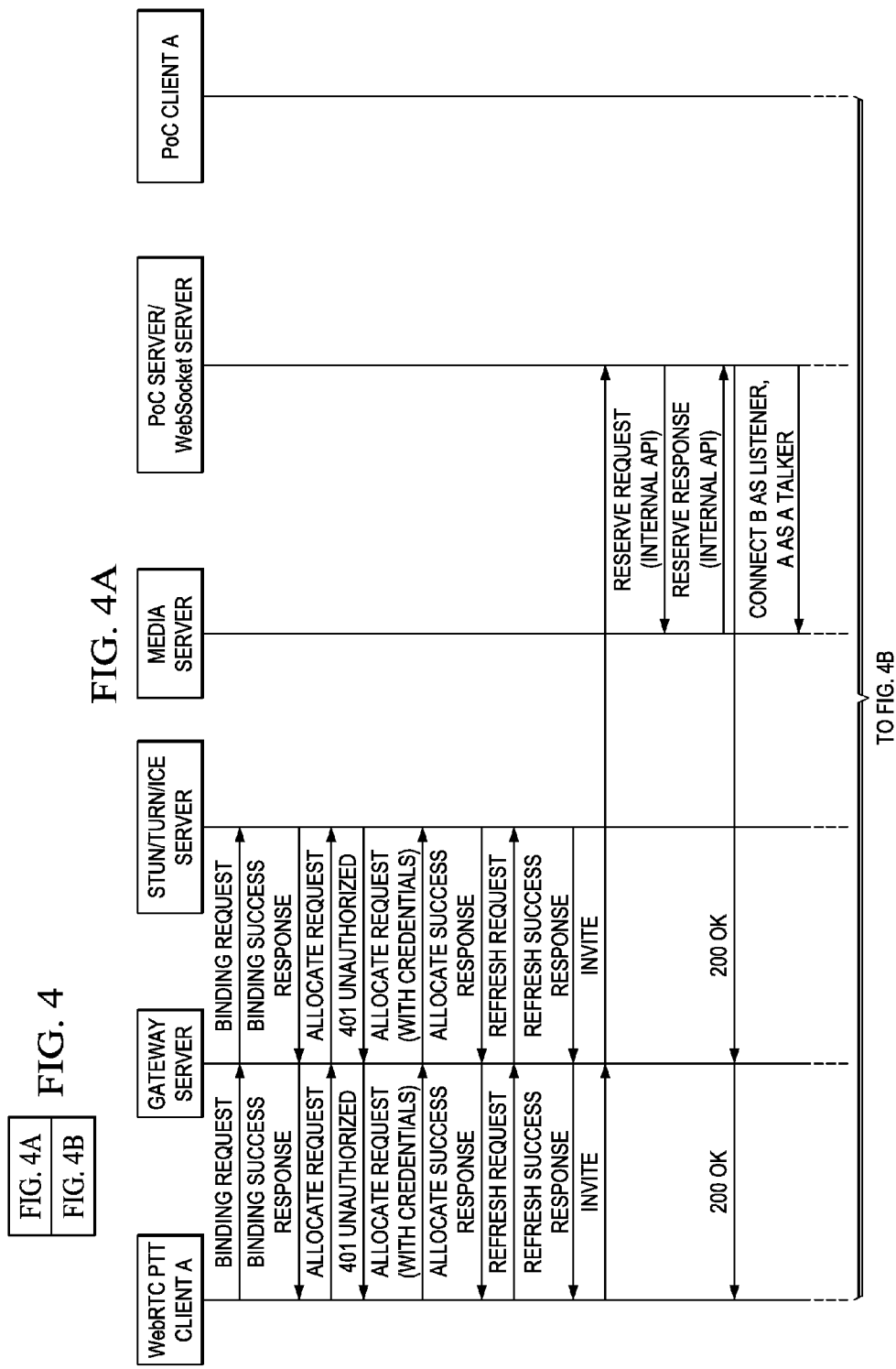

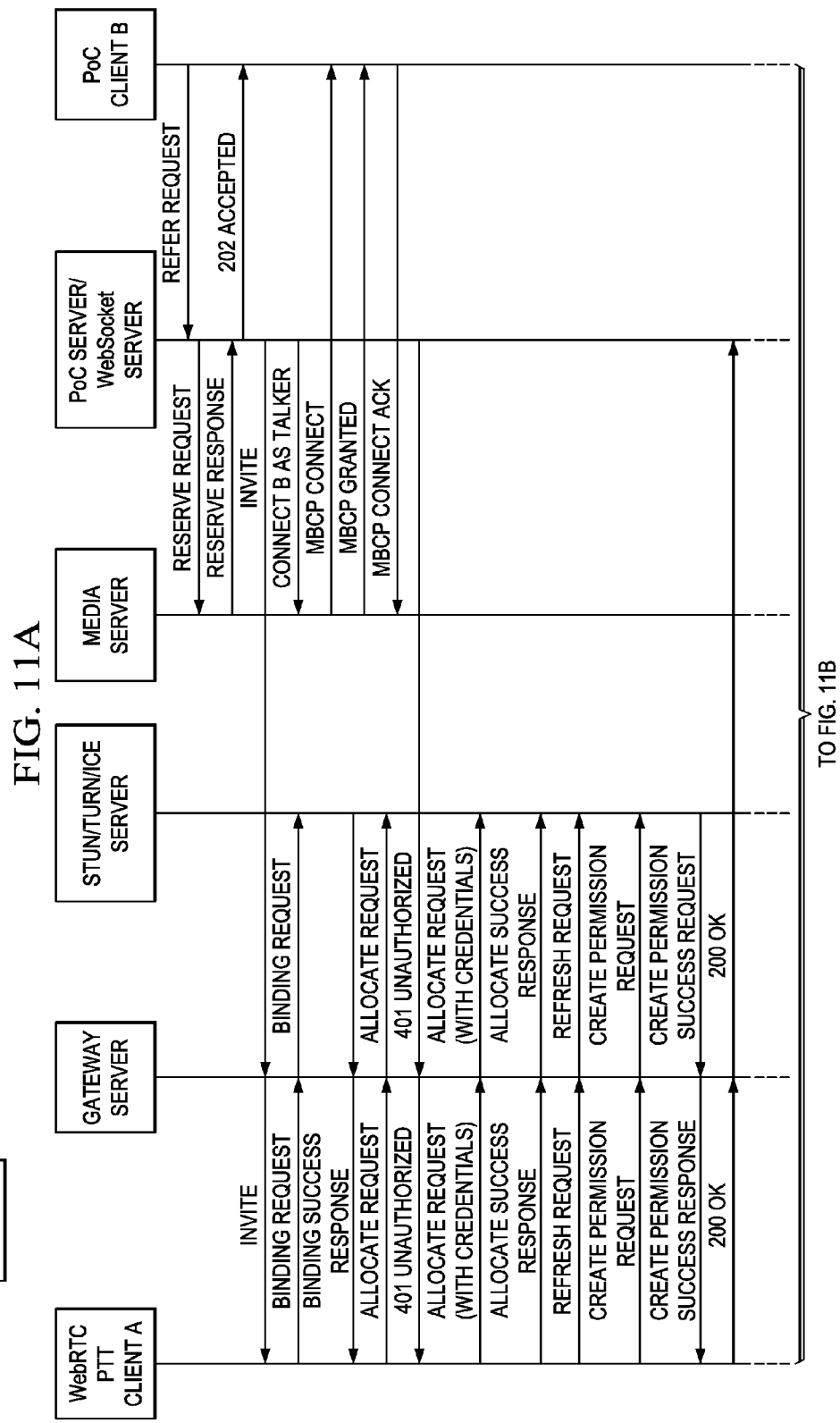

SYSTEM AND METHOD TO LEVERAGE WEB REAL-TIME COMMUNICATION FOR IMPLEMENTING PUSH-TO-TALK SOLUTIONS

CROSS-REFERENCE TO RELATED APPLICATIONS

This application is a continuation of Application Serial No. PCT/US2015/058088, filed on Oct. 29, 2015, entitled "System and Method to Leverage Web Real-Time Communication for Implementing Push-to-Talk Solutions," which claims the benefit under 35 U.S.C. Section 119(e) of U.S. Provisional Application Ser. No. 62/072,135, filed on Oct. 29, 2014, by Krishnakant M. Patel, Brahmananda R. Vempati, Harisha Mahabaleshwara Negalaguli, and Ramu Kandula, entitled "METHODS TO LEVERAGE WEBRTC FOR IMPLEMENTING PUSH-TO-TALK SOLUTIONS," and U.S. Provisional Application Ser. No. 62/117,575, filed on Feb. 18, 2015, by Krishnakant M. Patel, Brahmananda R. Vempati, Bibhudatta Biswal, Ravi Ayyasamy, Harisha Mahabaleshwara Negalaguli, and Ramu Kandula, entitled "METHODS TO LEVERAGE WEBRTC FOR IMPLEMENTING PUSH-TO-TALK SOLUTIONS," which applications are incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386 which application claims the benefit under 35 U.S.C. Section 119(e) of U.S. Provisional Application Ser. Nos. 60/382,981, 60/383,479 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," now U.S. Pat. No. 8,958,348, issued Feb. 17, 2015, which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K.K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K.K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217;

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694;

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292; U.S. Provisional Application Ser. No. 61/682,524; and U.S. Provisional Application Ser. No. 61/705,748;

U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," now U.S. Pat. No. 9,088,876, issued Jul. 21, 2015, which application claims the benefit under 35 U.S.C. Section 119(e) of U.S. Provisional Application Ser. No. 61/593,485;

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," now U.S. Pat. No. 9,137,646, issued Sep. 15, 2015, which application claims the benefit under 35 U.S.C. Section 119(e) of U.S. Provisional Application Ser. No. 61/730,856;

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109; and U.S. Provisional Application Ser. No. 61/821,975;

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895;

P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363; and U.S. Provisional Application Ser. No. 61/944,168;

P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897;

U.S. Utility Application Ser. No. 14/639,794, filed Mar. 5, 2015, by Krishnakant M. Patel, Brahmananda R. Vempati, Ravi Ayyasamy, and Bibhudatta Biswal, entitled "PUSH-TO-TALK-OVER-CELLULAR (POC) SERVICE IN HETEROGENEOUS NETWORKS (HETNETS) AND MULTI-MODE SMALL CELL ENVIRONMENTS," which application claims the benefit under 35 U.S.C. Section 119(e) of U.S. Provisional Application Ser. No. 61/948,429;

P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Serial Number PCT/US2014/047863;

P.C.T. International Application Serial Number PCT/US2015/45951, filed on Aug. 19, 2015, by Krishnakant M. Patel, Brahmananda R. Vempati, and Harisha Mahabaleshwara Negalaguli, entitled "RELAY-MODE AND DIRECT-MODE OPERATIONS FOR PUSH-TO-TALK-OVER-CELLULAR (PoC) USING WIFI TECHNOLOGIES," which application claims the benefit under 35 U.S.C. Section 119(e) of U.S. Provisional Application Ser. No. 62/039,272;

P.C.T. International Application Serial Number PCT/US2015/56712, filed on Oct. 21, 2015, by Krishnakant M. Patel, Ramu Kandula, Brahmananda R. Vempati, Pravat Kumar Singh, and Harisha Mahabaleshwara Negalaguli, entitled "SYSTEM FOR INTER-COMMUNICATION BETWEEN LAND MOBILE RADIO AND PUSH-TO-TALK-OVER-CELLULAR SYSTEMS," which application claims the benefit under 35 U.S.C. Section 119(e) of U.S. Provisional Application Ser. No. 62/066,533, all of which applications are incorporated by reference herein.

BACKGROUND

1. Field of the Invention

This invention relates in general to advanced voice services in wireless communications networks, and more specifically, to a system and methods to leverage Web Real-Time Communication (WebRTC) for implementing Push-to-Talk (PTT) solutions.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing (IC), Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE (3rd Generation/4th Generation/Long Term Evolution), etc.

Nonetheless, there is a need in the art for improvements to the methods and systems for delivering the advanced voice services, such as PoC/PTT, that comply with both existing and emerging wireless standards and yet provide superior user experiences. For example, many existing implementations of PoC/PTT do not support Internet standards. The present invention, on the other hand, satisfies the need for multiplexing data streams.

SUMMARY

To overcome the limitations in the prior art described above, and to overcome other limitations that will become apparent upon reading and understanding the present specification, the present invention discloses a system and methods system and methods to leverage WebRTC for implementing PTT solutions. One or more servers interface to a communications network to perform advanced voice services for one or more wireless or wired user devices, wherein the advanced voice services include a two-way half-duplex voice call within a group of the user devices comprising a PTT call session. At least one of the user devices communicates with at least one of the servers during the PTT call session using a WebRTC connection, and at least the media streams for the PTT call session are transmitted between the server and the user device using the WebRTC connection.

BRIEF DESCRIPTION OF THE DRAWINGS

Referring now to the drawings in which like reference numbers represent corresponding parts throughout:

FIGS. 4, 4A, and 4B are a call flow diagram of a 1-to-1 call request, according to one embodiment of the present invention.

FIGS. 11, 11A, and 11B illustrate the call flow for initiating a 1-to-1 call from a PoC Client to a WebRTC PTT Client, according to one embodiment of the present invention.

DETAILED DESCRIPTION OF ILLUSTRATIVE EMBODIMENTS

Figure 1:
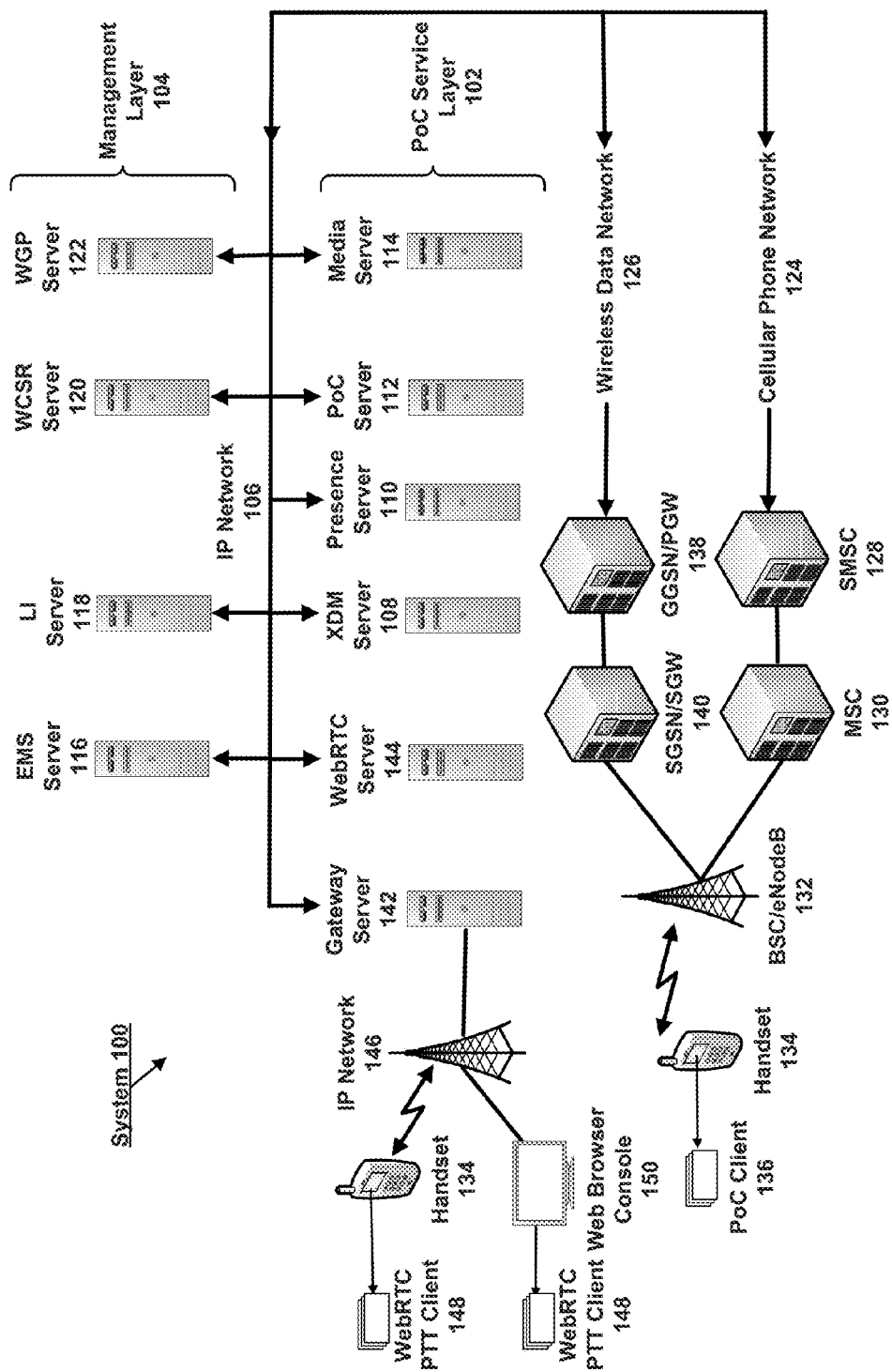
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| DTLS | Datagram Transport Layer Security |
| FQDN | Fully Qualified Domain Name |
| GPRS | General Packet Radio Service |
| GSM | Global System for Mobile communications |
| HTTP | Hypertext Transport Protocol |
| HTTPS | Secure Hypertext Transport Protocol |
| ICE | Interactive Connectivity Establishment |
| IMSI | International Mobile Subscriber Identity |
| IP | Internet Protocol |

| Acronym | Description |
| --- | --- |
| IPA | Instant Personal Alert |
| MBCP | Media Burst Control Protocol |
| MBMS/eMBMS | Multimedia Broadcast Multicast Services |
| MCA | Missed Call Alert |
| MCC | Mobile Country Code |
| MDN | Mobile Directory Number |
| MIME | Multipart Internet Mail Extensions |
| MNC | Mobile Network Code |
| MS-ISDN | Mobile Station International Subscriber Directory Number |
| NAT | Network Address Translation |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SGW | Serving GateWay |
| SIM | Subscriber Identity Module |
| SIP | Session Initiation Protocol |
| SMMP | Short Message peer-to-peer Protocol |
| SMS | Small Message Service |
| SRTCP | Secure Real-time Transport Control Protocol |
| SRTP | Secure Real-time Transport Protocol |
| SSID | Service Set Identifier |
| SSL | Secure Sockets Layer protocol |
| SSRC | Synchronization SouRCe |
| STUN | Traversal Utilities for NAT |
| TLS | Transport layer security protocol |
| TURN | Traversal Using Relay NAT |
| UDP | User Datagram Protocol |
| URI | Uniform Resource Identifier |
| VoIP | Voice-over-IP |
| WebRTC | Web Real-Time Communication |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 Call Session | A feature enabling a User to establish a Call Session with another User. |
| Ad Hoc Group Session | A Group Session established by a User to one or more Users listed on the invitation. The list includes Users or Groups or both. |
| Answer Mode | A Client mode of operation for the terminating Call Session invitation handling. |
| Controlling PoC Function | A function implemented in a PoC Server, providing centralized PoC/PTT Call Session handling, which includes media distribution, Talk Burst Control, Media Burst Control, policy enforcement for participation in the Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC/PTT service to the User. |
| Instant Personal Alert | A feature in which a User sends a SIP based instant message to another User requesting a 1-1 Call Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC/PTT Call Session handling, which includes policy enforcement for incoming PoC Call Sessions and relays Talk Burst Control and Media Burst Control messages between the PoC/PTT Client and the PoC Server performing the Controlling PoC Function. The Participating PoC Function may also relay RTP Media between the PoC/PTT Client and the PoC Server performing the Controlling PoC Function. |
| PoC/PTT Client | A functional entity that resides on the User Equipment that supports the PoC/PTT service. |
| Pre-Arranged Group Identity | A SIP URI identifying a Pre-Arranged Group. A Pre-Arranged Group Identity is used by the PoC/PTT Client, e.g., to establish Group Sessions to the Pre-Arranged Groups. |
| Pre-Arranged Group | A persistent Group. The establishment of a PoC/PTT Call Session to a Pre-Arranged Group results in the members being invited. |
| Pre-Established Session | The Pre-Established Session is a SIP Session established between the PoC/PTT Client and its Home PoC Server. The PoC/PTT Client establishes the Pre-Established Session prior to making requests for PoC/PTT Call Sessions to other Users. To establish a PoC/PTT Call Session based on a SIP request from the User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| WebRTC PTT Client | A functional entity that resides on the User that uses WebRTC technology to provide PoC/PTT service. |
| Public | These subscribers create and manage their contacts and groups. |
| Serving Server Subscription | A set of primary and secondary servers. The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired user device. The wireless data network 126, depending on its type, e.g., GPRS or 4G/LTE, includes one or more Gateway GPRS Support Nodes (GGSNs) or Packet Gateways (PGWs) 138 and Serving GPRS Support Nodes (SGSNs) or Serving GateWays (SGWs) 140, which also communicate with customer handsets 134 via BSCs or eNodeBs 132.

In one embodiment of the present invention, the PoC Service Layer 102 and Management Layer 104 are connected to one or more Gateway Servers 142 and one or more WebRTC Servers 144, wherein the Gateway Server 142 provides an interface to one or more external IP networks 146, in order to communicate with one or more WebRTC PTT Clients 148 executed on one or more IP-enabled devices, which may be fixed or mobile devices, such as handsets 134 and Web Browser Consoles 150.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 138 transfers IP packets between the PoC Client 136 and the various servers:

SIP/IP signaling messages between the PoC Server 112 and PoC Client 136 for control traffic exchange (i.e., control packets) for PoC call sessions.

RTP/IP, RTCP/IP and MBCP/IP packets between the Media Server 114 and PoC Client 136 for bearer traffic exchange (i.e., voice packets) for PoC call sessions.

SIP/IP signaling messages between the Presence Server no and PoC Client 136 for presence information.

XCAP/HTTP/IP and SIP/IP signaling between the XDM Server 108 and PoC Client 136 for document management.

The SMSC 128 handles authentication:

The XDM Server 108 communicates with the SMSC 128 via SMPP/IP for receiving the authentication code required for PoC Client 136 activation from the handset 134.

2.3 IP Network

The PoC Service Layer 102 also interacts with the following entities on the IP network 146:

The Gateway Server 142 transfers IP packets between the WebRTC PTT Clients 148 and the various servers:

SIP/IP signaling messages between the PoC Server 112 and WebRTC PTT Clients 148 for control traffic exchange (i.e., control packets) for PTT call sessions.

RTP/IP, RTCP/IP and MBCP/IP packets between the Media Server 114 and WebRTC PTT Clients 148 for bearer traffic exchange (i.e., voice packets) for PTT call sessions.

SIP/IP signaling messages between the Presence Server no and WebRTC PTT Clients 148 for presence information.

XCAP/HTTP/IP and SIP/IP signaling between the XDM Server 108 and WebRTC PTT Clients 148 for document management.

SIP/IP signaling messages between the XDM Server 108 and WebRTC PTT Clients 148 for receiving the authentication code required for WebRTC PTT Client 148 activation.

2.4 PoC Service Layer Elements

As noted above, the PoC Service Layer 102 is comprised of the following elements:

PoC Server 112,

Media Server 114,

Presence Server 110,

XDM Server 108,

Gateway Server 142, and

WebRTC Server 144

These elements are described in more detail below.

2.4.1 PoC Server

The PoC Server 112 handles the PoC/PTT call session management and is the core for managing the PoC/PTT services for the Clients 136, 148 using SIP protocol. The PoC Server 112 implements a Control Plane portion of Controlling and Participating PoC Functions. A Controlling PoC Function acts as an arbitrator for a PoC/PTT session and controls the sending of control and bearer traffic by the Clients 136, 148. A Participating PoC Function relays control and bearer traffic between the Clients 136, 148 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator Client 136, 148 to all recipients of the PoC/PTT session. The Media Server 114 also supports the Participating PoC Function by relaying the voice packets between Clients 136, 148 and the Media Server 114 supporting the Controlling PoC Function. The Media Server 114 also handles packets sent to and received from the Clients 136, 148 for floor control during PoC/PTT call sessions.

2.4.3 Presence Server

The Presence Server no implements a presence enabler for the PoC/PTT service. The Presence Server no accepts, stores and distributes Presence Information for Presentities, such as Clients 136, 148.

The Presence Server no also implements a Resource List Server (RLS), which accepts and manages subscriptions to Presence Lists. Presence Lists enable a "watcher" application to subscribe to the Presence Information of multiple Presentities using a single subscription transaction.

The Presence Server no uses certain XDM functions to provide these functions, which are provided by XDM Server 108.

2.4.4 XDM Server

The XDM Server 108 implements an XDM enabler for the PoC/PTT service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway Server

The Gateway Server 142 implements a interworking solution for the PoC/PTT service to communicate from the PoC system 100 via one or more IP network 146 to one or more WebRTC PTT Clients 148. Specifically, the Gateway Server 142 allows the PoC system 100 to provide PoC/PTT service over an IP network 146 (such as an external WiFi network), and supports a seamless user experience while the transport of IP control messages and IP voice data is transitioned between different types of communications networks, such as the cellular phone networks 124, wireless data networks 126 and IP networks 146. The Gateway Server 142 also resolves security concerns that arise with such interworking solutions.

This is necessary because the quality, performance and availability of the networks 124, 126, 146 typically vary from location to location based on various factors. In addressing these issues, the interworking solution implemented by the Gateway Server 142 provides following benefits:

- PoC/PTT services becomes available even in those locations where a cellular phone network 124 or wireless data network 126 is not available, but where a general purpose IP network 146 is available. This is particularly more useful in enhancing in-building coverage for the PoC/PTT service.
- By connecting over the IP network 146, the available IP bandwidth, quality and performance can be more streamlined and controlled since the IP network 146 (typically) has a greater capacity and throughput as compared to the cellular phone network 124 or wireless data network 126, which are more shared in nature.
- By utilizing the greater available bandwidth over the IP network 146, as compared to the cellular phone network 124 or wireless data network 126, it is possible to provide additional services (such as sharing large files) which otherwise is inefficient and costly on cellular phone networks 124 or wireless data networks 126.

These and other aspects of the interworking solution are described in more detail below.

2.5 Management Layer Elements

As noted above, the Management Layer 104 is comprised of the following elements:
- Element Management System (EMS) Server 116,
- Lawful Intercept (LI) Server 118,
- Web Group Provisioning (WGP) Server 122, and
- Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC/PTT services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC/PTT contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
- Create Subscriber account,
- Update Subscriber account,
- Delete Subscriber account,
- Mobile number change command,
- View Subscriber details (MDN, Group, Group members),
- Manage Corporate Accounts,
- Add CSR account,
- Delete CSR account.

3 System Functions

The following sections describe various functions performed by each of the components of the system architecture.

3.1 PoC Service Layer

3.1.1 PoC Server

The PoC Server 112 controls PoC/PTT call sessions, including 1-1, Ad Hoc and Pre-Arranged call sessions. The PoC Server 112 also controls Instant Personal Alerts (IPAs) and Missed Call Alerts (MCAs).

The PoC Server 112 expects the Clients 136, 148 to setup "pre-established sessions" at the time of start up and use these sessions to make outgoing PoC/PTT calls. The PoC Server 112 also uses pre-established sessions to terminate incoming PoC/PTT calls to the Clients 136, 148. The Clients 136, 148 may be setup in auto-answer mode by default. The use of pre-established sessions and auto-answer mode together allow for faster call setup for PoC/PTT call sessions.

The PoC Server 112 allocates and manages the media ports of the Media Servers 114 associated with each SIP INVITE dialog for pre-established sessions and controls the Media Servers 114 to dynamically associate these ports at run time for sending RTP packets during PoC/PTT call sessions. Media ports are assigned and tracked by the PoC Server 112 at the time of setting up pre-established sessions. The PoC Server 112 instructs the Media Server 114 to associate the media ports of various subscribers dynamically into a session when a PoC/PTT call is originated and this session is maintained for the duration of the call. The PoC Server 112 also controls the floor states of the various participants in a PoC/PTT call session by receiving indications from the Media Servers 114 and sending appropriate requests back to the Media Servers 114 to send MBCP messages to the participants in the PoC/PTT call. The Media Server 114 uses the media ports association and current talker information to send the RTP packets from the talker's media port onto the listeners' media ports.

In addition, the PoC Server 112 handles the incoming and outgoing Instant Personal Alerts and Missed Call Alerts by routing SIP MESSAGE requests to the Clients 136, 148 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the Clients 136, 148, as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from Clients 136, 148 are sent to the PoC Server 112, and the PoC Server 112 instructs the Media Server 114 appropriately. Based on these instructions, the Media Server 114 sends floor control messages to the Clients 136, 148 and sends the RTP packets received from the talker to all the listeners.

3.1.3 Presence Server

The Presence Server 110 accepts presence information published by Clients 136, 148, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive Client 136, 148 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the Clients 136, 148 or the WGP Server 122.

3.1.5 Gateway Server

The Gateway 142 performs interworking for the PoC/PTT service by communicating with the WebRTC PTT Clients 148 via one or more IP networks 146.

The WebRTC PTT Client 148 sets up one or more connections using the configured Fully Qualified Domain Name (FQDN), or absolute domain name, of the Gateway Server 142, which may be publicly exposed to the IP network 146. Secure transport protocols may (or may not) be used for the connections across the IP network 146. For example, the WebRTC PTT Clients 148 may use the Transport Layer Security (TLS) and/or Secure Sockets Layer (SSL) protocols for encrypting information transmitted over the connections between the WebRTC PTT Clients 148 and the Gateway Server 142.

In such an embodiment, all SIP signaling and voice data (RTP and RTCP) would be tunneled over the SSL/TLS connections between the WebRTC PTT Clients 148 and the Gateway Server 142. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the Gateway Server 142 may perform as an encryption/decryption off-loader that provides end-to-end encryption for all traffic transmitted to and from the WebRTC PTT Clients 148. Specifically, all of the traffic sent to the WebRTC PTT Clients 148 may be encrypted at the Gateway Server 142 and all the traffic received from the WebRTC PTT Clients 148 may be decrypted at the Gateway Server 142.

The Gateway Server 142 terminates the SSL/TLS connections and aggregates or dis-aggregates the WebRTC PTT Clients 148 traffic to the appropriate Servers 108, 110, 112, 114, 116, 118, 120, 122 and 144. Specifically, the Gateway Server 142 acts as an intelligent traffic distributor for SIP signaling and RTP/RTCP traffic by forwarding the traffic to the appropriate Servers 108, 110, 112, 114, 116, 118, 120, 122 and 144, depending on the message types and the availability of the Servers 108, 110, 112, 114, 116, 118, 120, 122 and 144. Consequently, the Gateway Server 142 is a single point-of-contact for all traffic to and from the WebRTC PTT Clients 148 at an IP transport layer via the IP network 146.

Typically, the SSL/TLS connections are persisted and used for any bidirectional data transfer between the Gateway Server 142, or other servers, and the WebRTC PTT Clients 148. Thus, the WebRTC PTT Clients 148 may maintain an "always-on" connection with the Gateway Server 142 by periodically sending "keep-alive" messages over the SSL/TLS connections.

3.2 Management Layer

3.2.1 EMS Server

The EMS Server 116 is the central management entity in the system and includes the following modules:

- A central application where all management business logic resides.
- A web server for serving the network operator's internal users. A corresponding client provides a user interface for viewing fault, configuration, performance and security information.
- A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

- Create Subscriber account,
- Update Subscriber account,
- Delete Subscriber account,
- Mobile number change command,
- Forced synchronization of a Subscriber,
- Deactivate a Subscriber account,
- Reactivate a Subscriber account,
- View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

- Group management,
- Contact management, and
- Associations between corporations.

With regard to group management, the CAT of the WGP Server 122 includes the following operations:

- Create, Update, Delete and View Corporate Groups,
- Add, Update, Delete and View Members of a Corporate Group,
- Manage Subscribers,
- Activate and Deactivate a Corporate Subscriber,
- Change a Subscriber type from "Corporate" to "Corporate And Public", and vice versa,
- Restrict Availability, i.e., do not allow subscriber to change their presence status, and
- Manage number porting or name change via phone assignment.

With regard to contact management, the CAT of the WGP Server 122 includes the following operations:

- Phone list management,
- N×N Contact Add (e.g., N contacts may be members of N groups),
- Add, Update, Delete and View Contacts for a specific subscriber, and
- Export and Import contacts at both the subscriber and corporate level.

With regard to associations between corporations, the CAT of the WGP Server 122 includes the following operations:

- Corporate Associations Attributes,
- Association Name,
- Association ID,
- Association Mode (e.g., One-way, Two-way), and
- Restricted List.

Once the association is created and accepted, corporate administrators can create contacts and groups using the association policies. Administrators from other corporations can view the contacts, and may or may not have the capability to add, update or delete the contacts.

- Corporate ID associated per corporate subscriber,
- Central management of corporate subscribers, groups, and contacts,
- Intercorporate associations, including contacts and whitelists,
- Phone list management (e.g., N×N contact add),
- Restrict Availability, and
- Import and Export contacts at both the subscriber and corporate level.

Note that, if the association is deleted, then usually all intercorporate contacts and group members will be deleted.

3.3 PoC/PTT Client

The following features are supported by the Clients 136, 148:

- PoC/PTT calls, Instant Personal Alert (IPA), and Missed Call Alert (MCA),
- Presence, and
- Contact and Group Management.

The Client 136, 148 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server no as a "watcher" of all contacts in the Client 136, 148 and updates the user interface of the Client 136, 148 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the Client 136, 148 based on the notifications it receives from the XDM Server 108.

The client module provides the most important function of making and receiving PoC/PTT calls. To support PoC/PTT calls, the client module creates and maintains pre-established sessions with the PoC Server 112. The client module supports 1-1, Ad Hoc and Pre-Arranged calls. The client module also supports sending and receiving Instant Personal Alerts (IPA).

4 State Diagram for a Poc/Ptt Call Session

Figure 2:
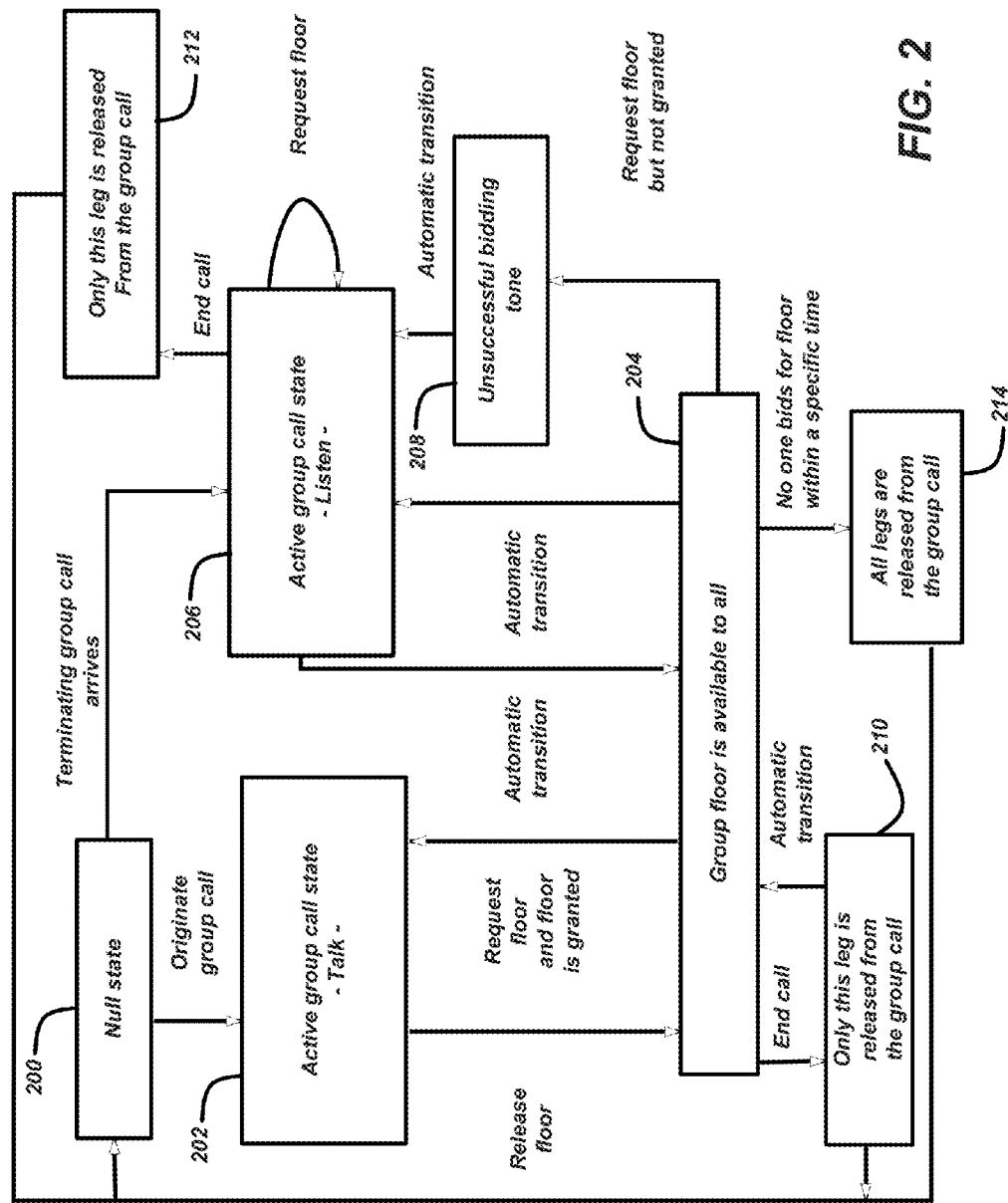
FIG. 2 is a state diagram that illustrates the operation of a PoC/PTT call session according to one embodiment of the present invention.

FIG. 2 is a state diagram that illustrates the operation of a PoC/PTT call session according to one embodiment of the present invention.

State 200 represents a Client 136, 148 in a NULL state, i.e., the start of the logic. A transition out of this state is triggered by a user making a request to originate a PoC/PTT call, or by a request being made to terminate a PoC/PTT call. A request to originate a PoC/PTT call is normally made by pressing a PoC/PTT button, but may be initiated in this embodiment by dialing or entering some sequence of one or more numbers on the handset 134 or other device that are interpreted by the PoC Server 112, by pressing one or more other keys on the handset 134 or other device that are interpreted by the PoC Server 112, by speaking one or more commands that are interpreted by the PoC Server 112, or by some other means.

State 202 represents the Client 136, 148 in an active group call state, having received a "floor grant" (permit to speak). In this state, the user receives a chirp tone that indicates that the user may start talking. The user responds by talking. The Client 136, 148 uses the reverse traffic channel to send voice frames to the Media Server 114, and the Media Server 114 switches voice frames only in one direction, i.e., from talker to one or more listeners, which ensures the half-duplex operation required for a PoC/PTT call.

State 204 represents the group "floor" being available to all members of the group. When the talking user signals that the floor is released, the floor is available to all group members. The signal to release the floor is normally made by releasing the PoC/PTT button, but may be performed in this embodiment by voice activity detection, e.g., by not speaking for some time period (which is interpreted by the PoC Server 112 as a release command). All members of the group receive a "free floor" tone or other signal. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the Client 136, 148 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC/PTT button, but may be performed in this embodiment by voice activity detection, e.g., by speaking for some time period (which is interpreted by the PoC Server 112 as a request command).

State 208 represents a user receiving an "unsuccessful bidding" tone, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Leveraging Webrtc for Implementing Ptt Solutions

With the Internet trend of voice communication between virtually any device, developing and porting Clients 136 for such devices has been challenging. While PoC Client 136 are available for use on 4G/LTE and WiFi networks, there still remain a number of problems.

With the introduction and wide acceptance of Web Real-Time Communication (WebRTC) as a standard for web browsers, WebRTC PTT Clients 148 can be adapted to realize PTT on any device with supported web browsers. This invention describes the use of WebRTC to implement PTT.

5.1 WebRTC

WebRTC is a standard drafted by the World Wide Web Consortium (W3C) that supports browser-based applications for real-time communication, such as voice calling, video chat, and peer-to-peer file sharing. Generally, SIP over WebSockets is used as the signaling protocol, although it is not mandated.

5.2 Architecture Overview

To realize PTT using WebRTC, the PoC system 100 needs an audio path and a persistent signaling path to communicate with WebRTC PTT Clients 148. WebRTC defines and provides ways to create an audio path through RTP, and leaves the choice of using signaling out of band, free to the implementer to define it.

WebRTC PTT Clients 148 require persistent connection for signaling, which are provided by WebSockets. Since modern browsers support both WebRTC and WebSockets, SIP over WebSockets was chosen for signaling. This combination makes realization of WebRTC PTT Clients 148 on these browsers highly viable.

Figure 3:
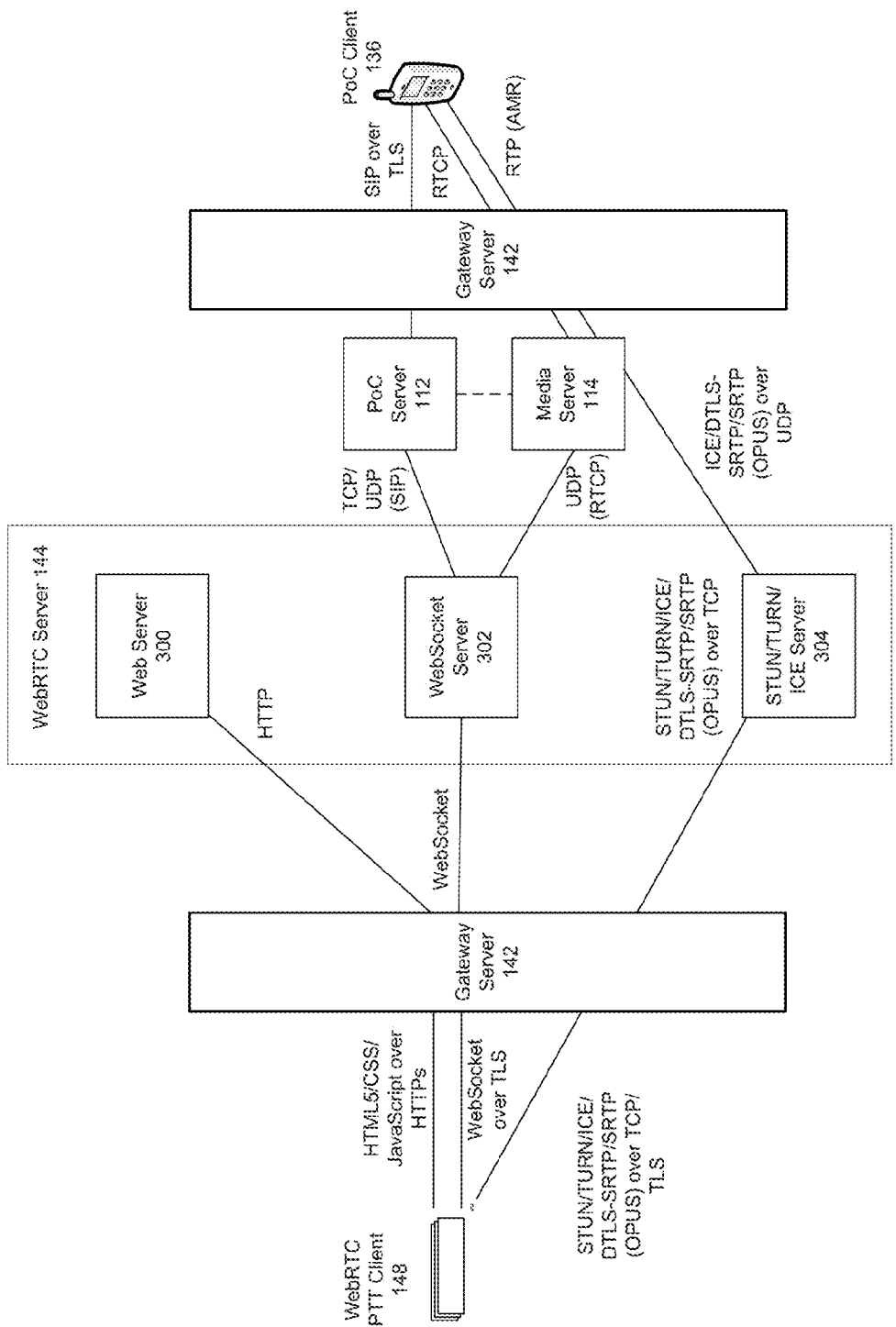
FIG. 3 is a diagram depicts the components and connectivity between components necessary for implementing WebRTC in a PoC system, according to one embodiment of the present invention.

FIG. 3 is a diagram depicts the components and connectivity between components necessary for implementing WebRTC in the PoC system 100 according to one embodiment of the present invention.

To support WebRTC in the PoC system 100, the WebRTC Server 144 (or another server) implements the following server components:
  Web Server 300: Provides HTTP support for WebRTC PTT Clients 148.
  WebSocket Server 302: Provides WebSocket support for SIP communication and the multiplexing of MBCP messages over SIP for WebRTC PTT Clients 148.
  STUN/TURN/ICE Server 304: Provides services required for WebRTC RTP connectivity for WebRTC PTT Clients 148.

Each WebRTC PTT Client 148 establishes a WebSocket connection with the WebSocket Server 302. The WebRTC PTT Client 148 communicates with the WebSocket Server 302 for SIP signaling.

Also, all MBCP messages are sent over a WSS (WebSocket Secure) connection. Since all MBCP messages contain MDN information, the MDN information is used for identification and/or routing purposes.

All signaling messages are sent over the WSS connection as well. All SIP messages are delivered to a SIP Proxy hosted by the PoC Server 112 and the SIP Proxy routes it to the appropriate server.

The WebRTC PTT Client 148 also communicates with a STUN/TURN/ICE Server 304 for STUN, TURN or ICE related messages, as well as actual media (RTP/RTCP) packets over DTLS-SRTP/DTLS-SRTCP.

In addition, the WebRTC PTT Client 148 may establish an HTTP/HTTPS connection to the Web Server 300.

The Gateway Server 142 is used for SSL offloading and terminates the TLS connection from the WebRTC PTT Client 148 and forwards the respective protocol messages to the other servers. For each Web Server 300, WebSocket Server 302, and STUN/TURN/ICE Server 304, virtual server instances may be created on the Gateway Server 142 and have separate IP addresses.

5.3 WebRTC PTT Call Flows

The WebRTC PTT client 148 supports various PoC Services call flows including the following:

1. Initiating a 1-to-1 call from a WebRTC PTT Client 148 to a PoC Client 136.
2. Initiating a 1-to-1 call from a PoC Client 136 to a WebRTC PTT Client 148
3. A group call from a WebRTC PTT Client 148 to a PoC Client 136.
4. A group call from a PoC Client 136 to a WebRTC PTT Client 148.
5. An ad-hoc call from a WebRTC PTT Client 148 to a PoC Client 136.
6. An ad-hoc call from a PoC Client 136 to a WebRTC PTT Client 148
7. Initiating a Call Rejoin.
8. Floor Control.
9. (IPA) Instant Personal Alert, (MCA) Missed Call Alert.

Call signaling describes all the protocol involves in a WebRTC PTT call, such as STUN, TURN, ICE, SIP, SDP, RTP, RTCP, etc. At the beginning of the call signaling, a complete call flow is presented and each stage of the call flow is mentioned with respect to different phases of the call.

Specific examples of the WebRTC call signaling are set forth in more detail below.

5.3.1 Initiating a 1-to-1 Call from a WebRTC PTT Client to a PoC Client

Figure 4B:
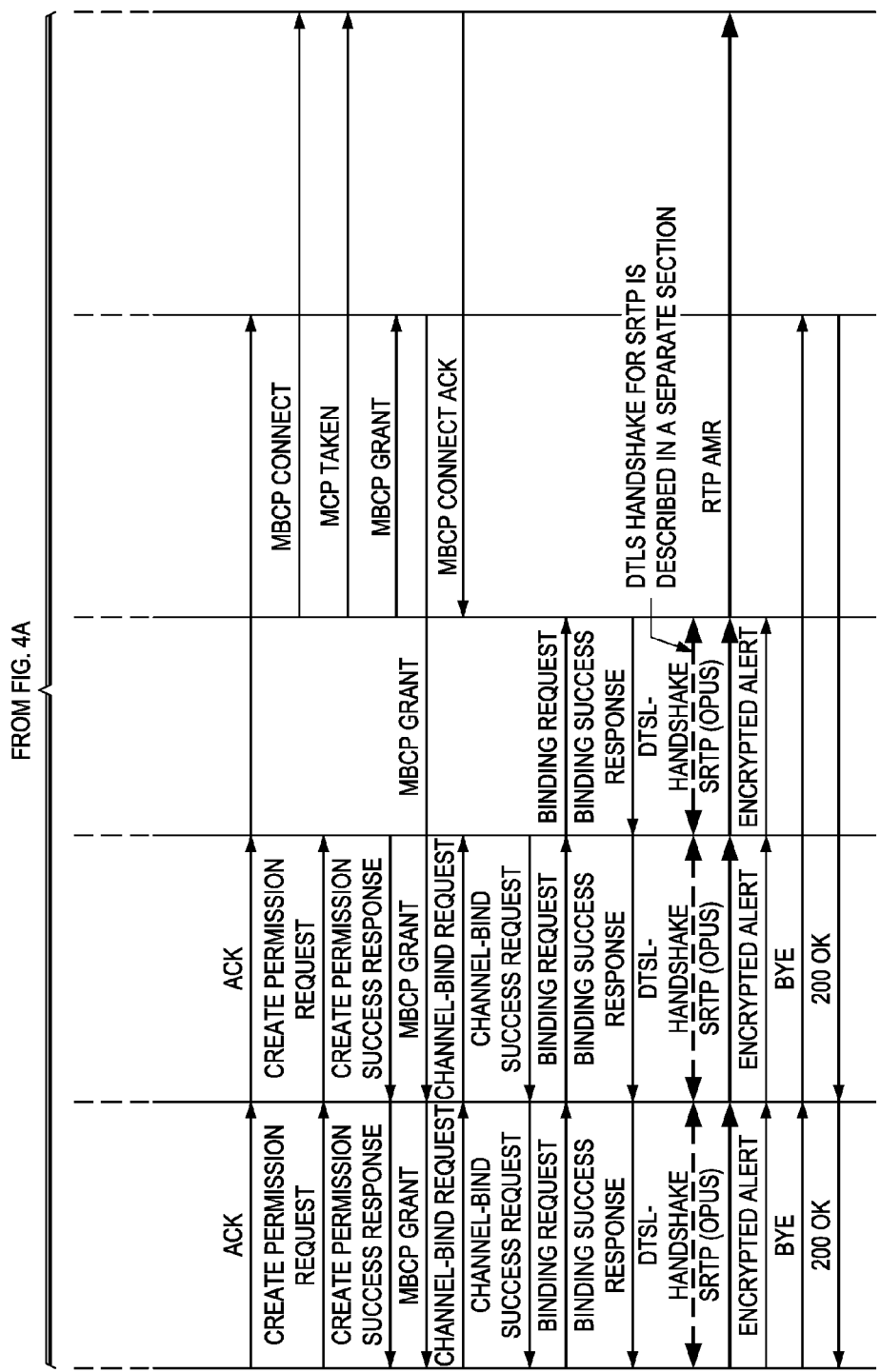

FIG. 4 is a call flow diagram of a 1-to-1 call request according to one embodiment of the present invention. It is assumed that a connection from the WebRTC PIT Client 148 to the WebSocket Server 302 has already been established and the WebRTC PTT Client 148 has already registered. For ease of illustration, FIG. 4 is broken up into FIGS. 4A and 4B.

From the call flow of FIG. 4 (which includes FIGS. 4A and 4B), the following phases are described from call establishment until call release.

1. Obtaining a relayed Transport Address.
2. Call Setup.
3. Create Permission and Channel Binding.
4. ICE Connectivity Check.
5. DTLS Handshake.
6. Call Release.

These are described in more detail below.

5.3.1.1 Obtaining a Relayed Transport Address

Figure 5:
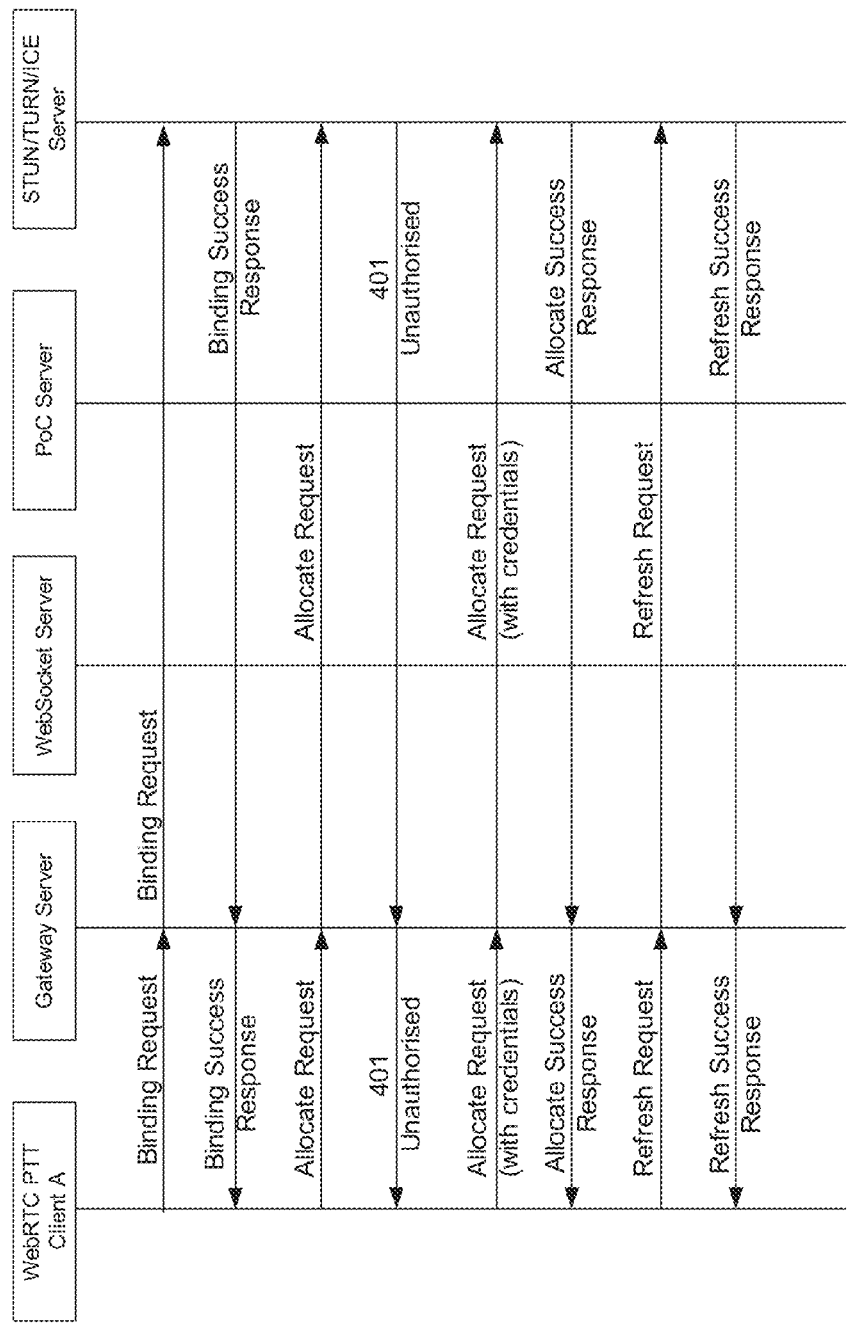
FIG. 5 illustrates the call flow for obtaining a relayed Transport Address, according to one embodiment of the present invention.

FIG. 5 illustrates the call flow for obtaining a relayed Transport Address.

A STUN bind request and obtaining the relayed transport address is the initial step of the call initiation from the WebRTC PTT Client 148. The WebRTC PTT Client 148 sends an Allocate Request to the STUN/TURN/ICE Server 304 and the STUN/TURN/ICE Server 304 replies with an Allocate Success Response containing the allocated relayed transport address.

The following messages are shown in the figure.

Binding Request and Response:

The initial binding request and response is a STUN bind request to the configured STUN/TURN/ICE Server 304 address in the WebRTC PTT Client 148 and the response is with the server reflexive IP address and port.

Binding Request:

A STUN Binding Request with a message cookie and transaction ID.

Binding Response:

A STUN Binding Success Response with a mapped address, which is a server reflexive IP address and port number.

Allocate Request:

An allocation conceptually is comprised of the following state data:

1. The relayed transport address;
2. A 5-tuple comprised of: the client's IP address, the client's port, the server's IP address, the server's port, transport protocol);
3. The authentication information;
4. The time-to-expiry.

The relayed transport address is the transport address allocated by the STUN/TURN/ICE Server 304 for communicating with peers, while the 5-tuple describes the communication path between the WebRTC PTT Client 148 and the STUN/TURN/ICE Server 304. Both the relayed transport address and the 5-tuple must be unique across all allocations, so either one can be used to uniquely identify the allocation.

The authentication information (e.g., username, password, realm, and nonce) is used to both verify subsequent requests and to compute the message integrity of responses.

The time-to-expiry is the time in seconds left until the allocation expires. Each allocate or refresh transaction sets this timer.

401 Unauthorised (Allocate Error Response):

The STUN/TURN/ICE Server 304 can challenge the WebRTC PTT Client 148 with an Allocate Error Response with a 401 unauthorized response code, which means the request did not contain the correct credentials to proceed. The WebRTC PTT Client 148 should retry the request with the proper credentials.

Allocate Request (with Credentials):

This time, the WebRTC PTT Client 148 again sends an Allocate Request with the proper credential for authentication purpose. The authentication information (e.g., username, password, realm, and nonce) is used to both verify subsequent requests and to compute the message integrity of responses. The username, realm, and nonce values are initially those used in the authenticated Allocate Request that creates the allocation.

Allocate Success Response:

If the WebRTC PTT Client 148 receives an Allocate Success Response, then it must check that the mapped address and the relayed transport address are in an address family that the WebRTC PTT Client 148 understands and is prepared to handle.

The WebRTC PTT Client 148 must also remember the 5-tuple used for the request, and the username and password it used to authenticate the request, to ensure that it reuses them for subsequent messages. The WebRTC PTT Client 148 also needs to track the channels and permissions it establishes on the STUN/TURN/ICE Server 304.

Refresh Request:

The Refresh transaction updates the time-to-expiry timer of an allocation. If the WebRTC PTT Client 148 wishes the STUN/TURN/ICE Server 304 to set the time-to-expiry timer to something other than the default lifetime, it includes a LIFETIME attribute with the requested value.

Refresh Success Response:

If the WebRTC PTT Client 148 request contains a LIFETIME attribute, then the STUN/TURN/ICE Server 304 computes the minimum of the requested lifetime and the maximum allowed lifetime. If this computed value is greater than the default lifetime, then the "desired lifetime" is the computed value. Otherwise, the "desired lifetime" is the default lifetime.

5.3.1.2 Call Setup

Figure 6:
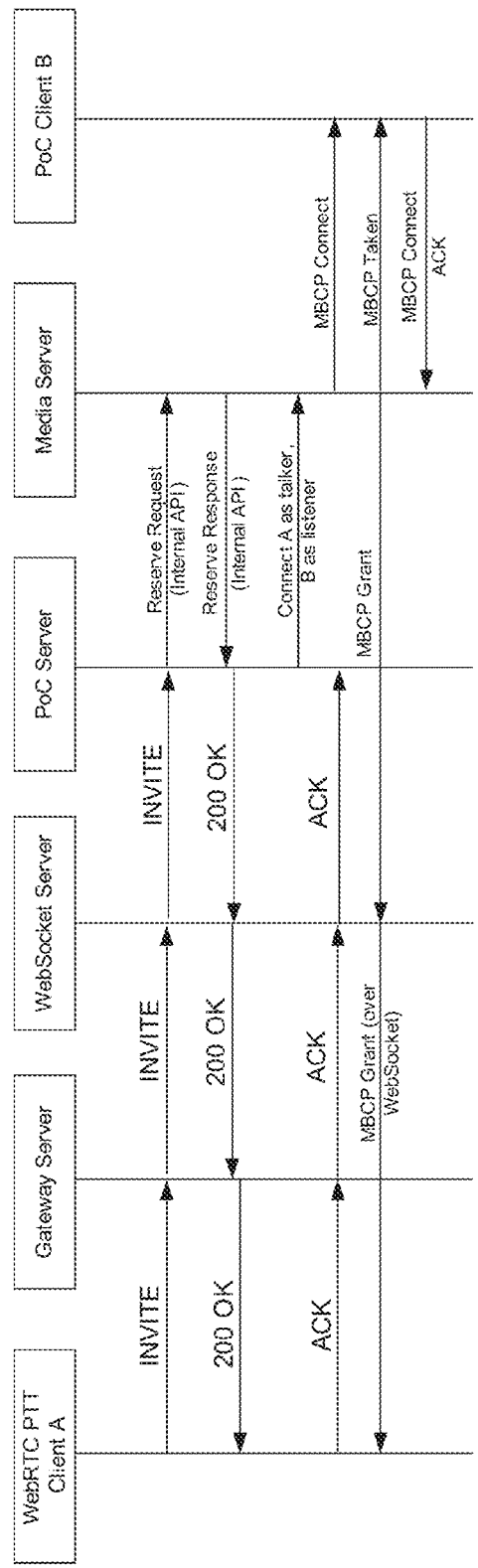
FIG. 6 illustrates the call flow for call setup, according to one embodiment of the present invention.

FIG. 6 illustrates the call flow for call setup.

As part of the call setup procedure, the protocol used is SIP. The WebRTC PTT Client 148 sends SIP messages within a WebSocket frame to the WebSocket Server 302 as pall of a text frame, and WebSocket Server 302 interprets the same and forwards it to the PoC Server 112. As part of the offer-answer model, the media session related information with respect to relayed transport address, etc., are exchanged and call setup is performed.

5.3.1.3 Create Permission and Channel Binding

Figure 7:
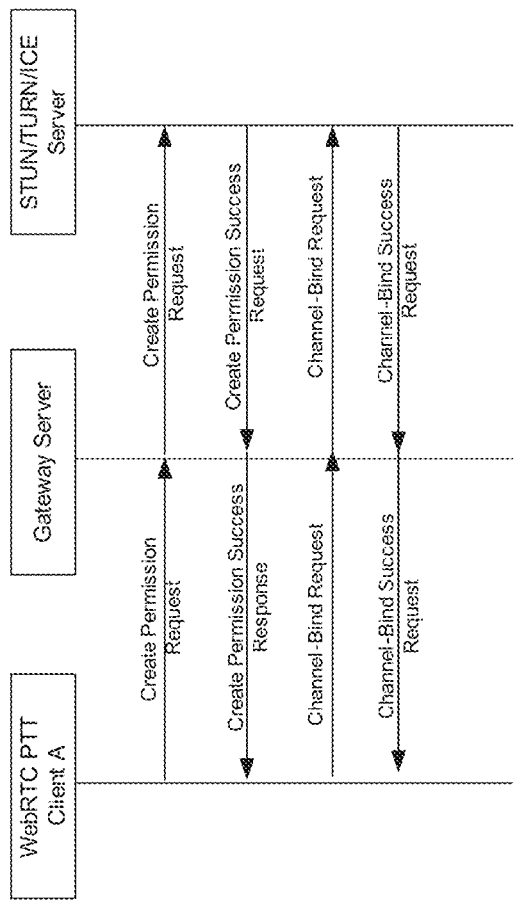
FIG. 7 illustrates the call flow for Create Permission and Channel Binding, according to one embodiment of the present invention.

FIG. 7 illustrates the call flow for Create Permission and Channel Binding.

The WebRTC MT Client 148 sends a Create Permission Request to the STUN/TURN/ICE Server 304 to create a permissions check system for peer-server communications. In other words, when a peer is finally contacted and sends information back to the STUN/TURN/ICE Server 304 to be relayed to the WebRTC PTT Client 148, the STUN/TURN/ICE Server 304 uses the permissions to verify that the peer-to-server communication is valid. After that it reserves a channel using the Channel Bind Request. a Channel Bind method requires a channel being reserved, which needs to be periodically refreshed.

The following messages are shown in the figure.

Create Permission Request:

In a Create Permission Request, the WebRTC PTT Client 148 must include at least one peer address attribute, and may include more than one such attribute.

Create Permission Success Response:

This is the success response for the Create Permission Request from the STUN/TURN/ICE Server 304.

Channel-Bind Request:

Channel bindings are specific to an allocation, so that the use of a channel number or peer transport address in a channel binding in one allocation has no impact on their use in a different allocation. If an allocation expires, all its channel bindings expire with it.

A channel binding is comprised of:
1. Channel number;
2. Transport address (of the peer); and
3. Time-to-expiry timer.

Channel-Bind Success Request:

This is the success response for the Channel-Bind Request from the STUN/TURN/ICE Server 304.

5.3.1.4 ICE Connectivity Check, DTLS Handshake and Media

Figure 8:
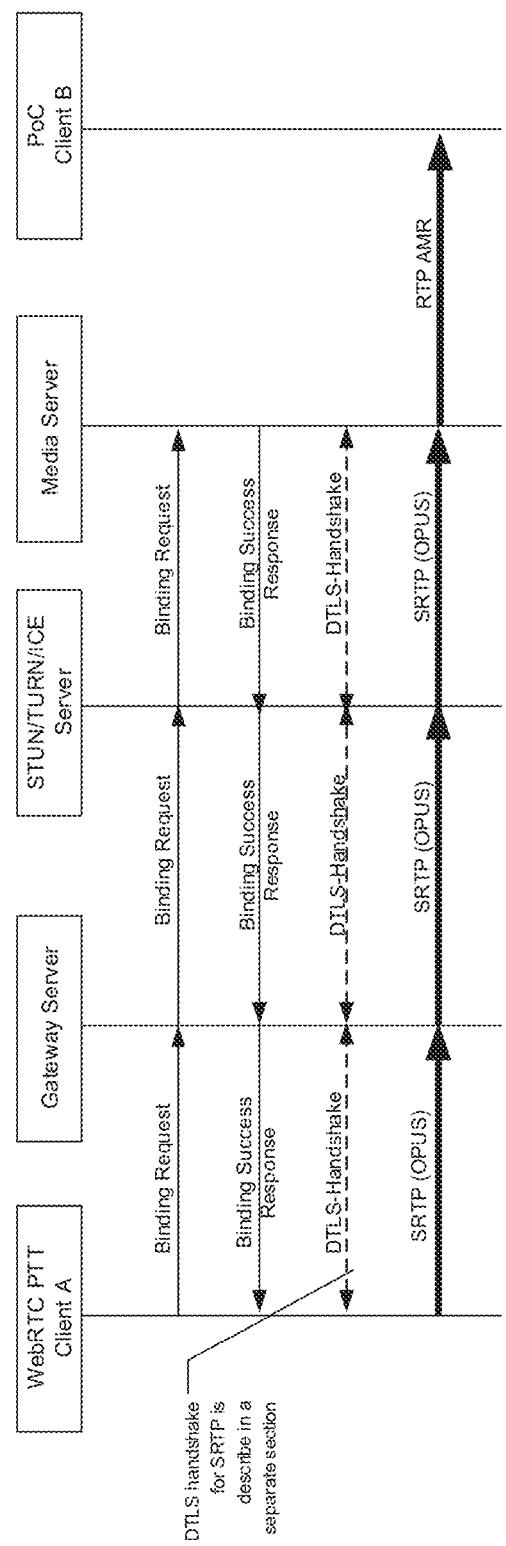
FIG. 8 illustrates the call flow for ICE connectivity, DTLS handshake and media, according to one embodiment of the present invention.

FIG. 8 illustrates the call flow for ICE connectivity, DTLS handshake and media.

A STUN Binding Request is used for the connectivity check, and the STUN Binding Response will contain the agent's translated transport address on the public side of any NATs between the agent and its peer. If this transport address is different from other candidates the agent already learned, it represents a new candidate, called a "peer reflexive candidate," which then gets tested by ICE just the same as any other candidate.

The following messages are shown in the figure.

Binding Request:

This Binding Request is generated from the WebRTC PTT Client 148 to the STUN/TURN/ICE Server 304 and further extended to the Media Server 114 to have an end-to-end connectivity check. The request is sent at periodic intervals from the WebRTC PTT Client 148.

Binding Success Response:

The Binding Success Response is sent by the STUN/TURN/ICE Server 304.

Figure 9:
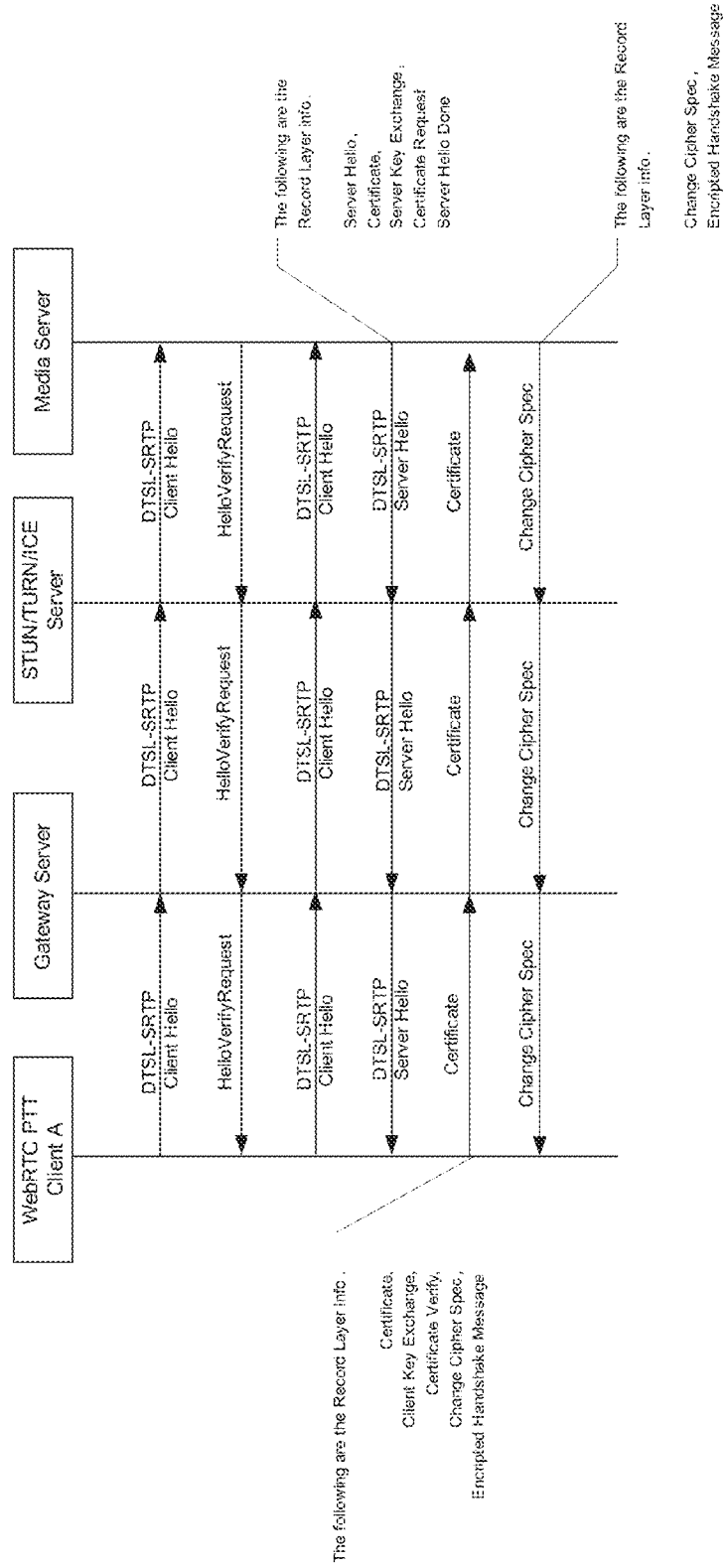
FIG. 9 illustrates the call flow for the DTLS handshake, which is a part of ICE check connectivity according to one embodiment of the present invention.

DTLS Handshake: FIG. 9 illustrates the call flow for the DTLS handshake, which is a part of ICE check connectivity. DTLS-SRTP procedures are utilized to protect the media stream. DTSL-SRTP Client Hello, Hello Verify Request, Server Hello, Certificate and Change Cipher Spec exchange flows are as per DTLS standard specifications.

SRTP (OPUS): Message transport within the session is provided using a secure version of RTP, which includes encryption, message authentication and integrity, and replay protection for RTP data in both unicast and multicast applications. OPUS identifies the codec being used for voice messages.

5.3.1.5 Call Release

Figure 10:
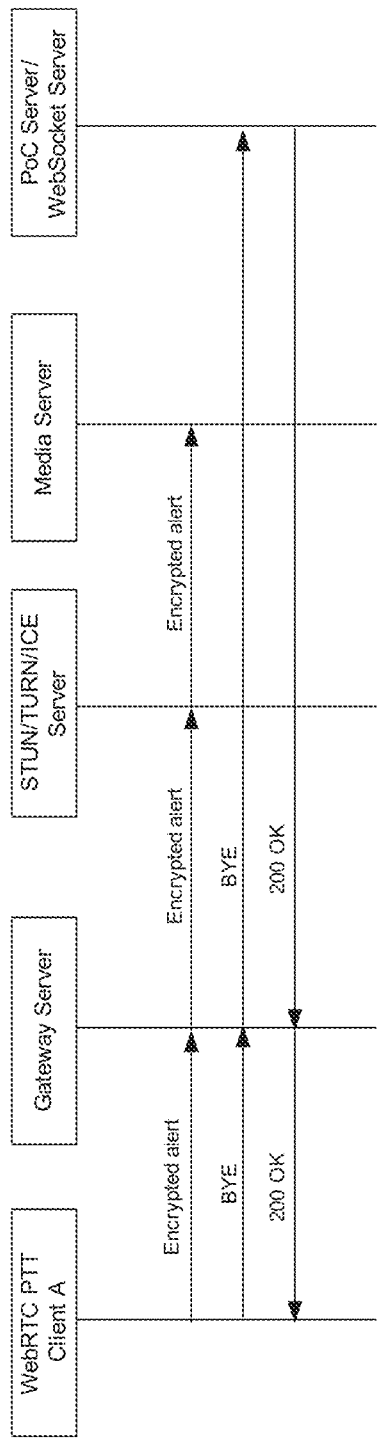
FIG. 10 illustrates the call flow for call release, according to one embodiment of the present invention.

FIG. 10 illustrates the call flow for call release.

Call release occurs from the WebRTC PTT Client 148, and as part of the call flow, an Encrypted Alert is sent first to terminate the DTLS connection with an appropriate alert type followed by a SIP signaling BYE message.

The following messages are shown in the figure.

Encrypted Alert:

Basically, this message is used to terminate the DTLS connection. Alert messages convey the severity of the message (warning or fatal) and a description of the alert. Alert messages with a level of fatal result in the immediate termination of the connection.

BYE Request:

Termination of the call happens when a SIP request BYE is received from the WebRTC PTT Client 148.

200 OK Response:

A success final response of the BYE request.

5.3.2 Initiating a 1-to-1 Call from a PoC Client to a WebRTC PTT Client

Figure 11B:
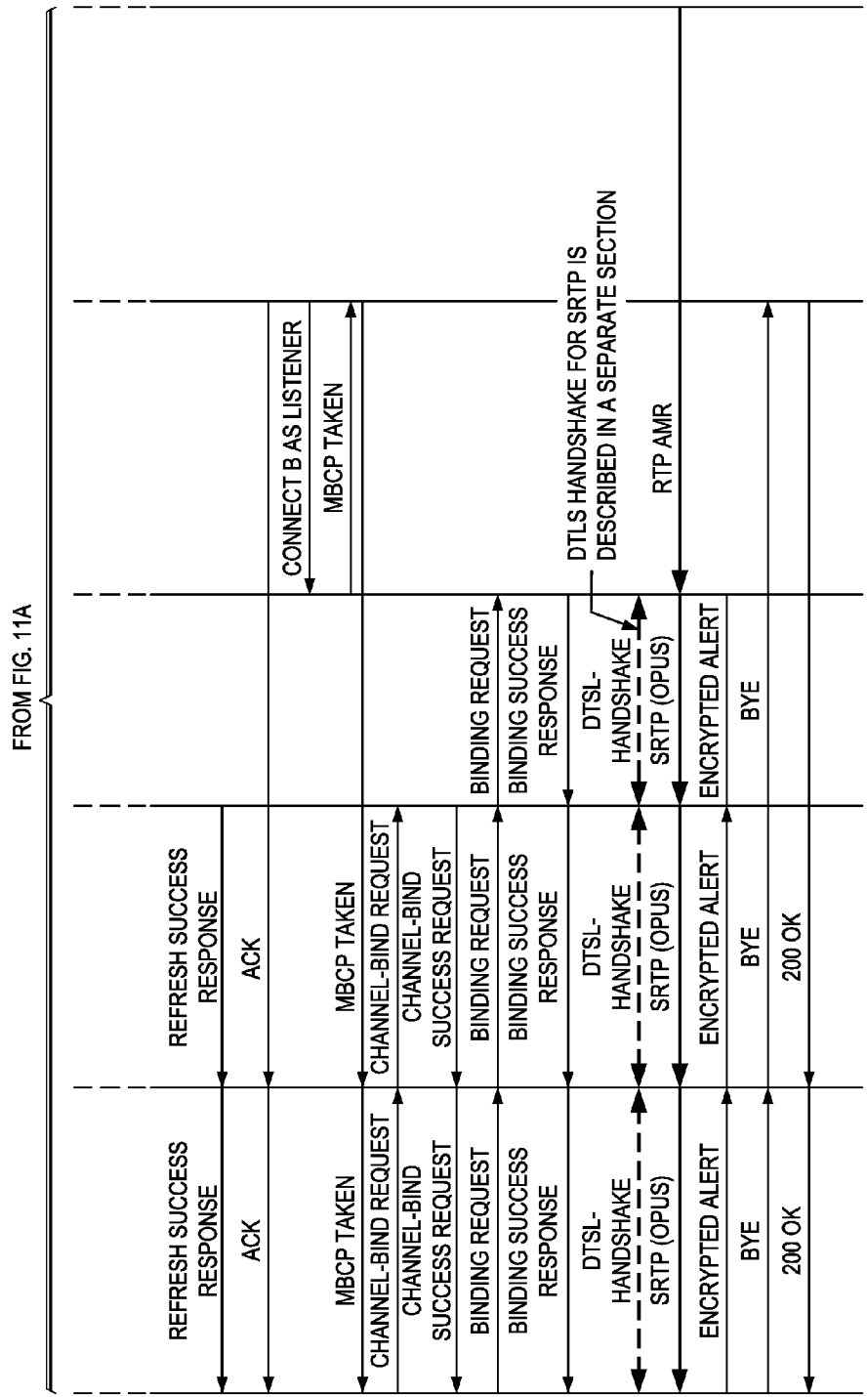

FIG. 11 illustrates the call flow for initiating a 1-to-1 call from a PoC Client 136 to a WebRTC PTT Client 148. For ease of illustration, FIG. 11 is broken up into FIGS. 11A and 11B.

When initiating a 1-to-1 call from a PoC Client 136 to a WebRTC PTT Client 148, there is a small change in the call flow. Once the WebRTC PTT Client 148 receives an INVITE request, then the WebRTC PTT Client 148 receives the offer from the STUN/TURN/ICE Server 304, and initiates allocation and create permission requests to the STUN/TURN/ICE Server 304. The descriptions of these messages provided above in the 1-to-1 call between the WebRTC PTT Client 148 and the PoC Client 136 are valid for this scenario as well.

5.3.3 Initiating a Group Call from a WebRTC PTT Client to a PoC Client

Figure 12:
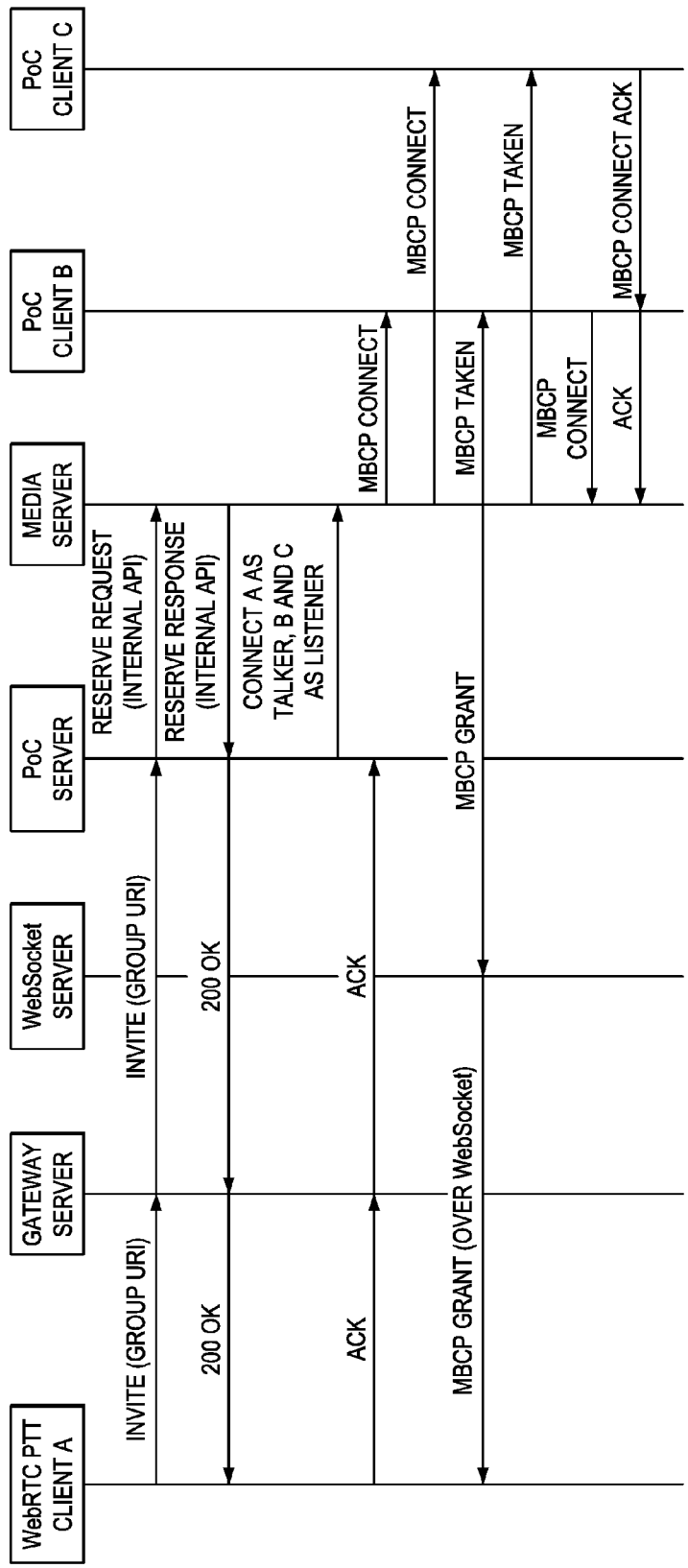
FIG. 12 illustrates the call flow for initiating a group call from a WebRTC PTT Client to a PoC Client, according to one embodiment of the present invention.

FIG. 12 illustrates the call flow for initiating a group call from a WebRTC PTT Client 148 to a PoC Client 136.

Initiating a group call from a WebRTC PTT Client 148 to a PoC Client 136 is similar to a 1-to-1 call request, although the SIP signaling differs as part of the call setup call flow where the group identification has to be present. It has been assumed that a WebSocket connection from the WebRTC PTT Client 148 to the WebSocket Server 302 has already been established, and the WebRTC PTT Client 148 has already registered. The remainder of the call flow is similar to the 1-to-1 call described above.

1. Obtaining relayed Transport Address.
2. Call Setup (Message content is changed), as shown in FIG. 12.
3. Create Permission and Channel binding
4. ICE Connectivity Check.
5. DTLS Handshake
6. Call Release 5.3.4 Initiating a Group Call from a PoC Client to a WebRTC PTT Client This is standard OMA PoC call flow from the PoC Client 136 with a REFER message. If any participant from the group is a WebRTC PTT Client 148 then the terminating leg towards the WebRTC PTT Client 148 is similar to the 1-to-1 call flow described above.

5.3.5 Initiating an Ad-hoc Call from a WebRTC PTT Client to a PoC Client

Initiating an ad-hoc call from a WebRTC PTT Client 148 to a PoC Client 136 is similar to the earlier WebRTC calls, wherein the SIP signaling differs as part of the call setup call flow, in that the ad-hoc group participants have to be present. It has been assumed that a WebSocket connection from the WebRTC PTT Client 148 to the WebSocket Server 302 has already been established and the WebRTC PTT Client 148 has already registered. The remainder of the call flow is similar to the 1-to-1 call described above.

1. Obtaining relayed Transport Address.
2. Call Setup (Message content is changed)
3. Create Permission and Channel binding
4. ICE Connectivity Check.
5. DTLS Handshake
6. Call Release 5.3.6 Initiating an Ad-hoc Call from a PoC Client to a WebRTC PTT Client Initiating an ad-hoc call from a PoC Client 136 to a WebRTC PTT Client 148 is similar to the above ad-hoc call, as well as earlier WebRTC calls.

5.3.7 Initiating a Call Rejoin

WebRTC PTT call signaling comprises on-demand call signaling, and in the case of a Call Rejoin scenario from the client's call history or from an MCA, the WebRTC PTT Client 148 has to use an INVITE message to initiate a call.

Initiating a group and/or 1-to-1 call from a WebRTC PTT Client 148 is similar to a 1-to-1 call request, wherein the SIP signaling differs as part of the call setup depending upon the type of call. It is assumed that a WebSocket connection from the WebRTC PTT Client 148 to the WebSocket Server 302 has already been established and the WebRTC PTT Client 148 has already registered. The remainder of the call flow is similar to the 1-to-1 call described above.

Figure 13:
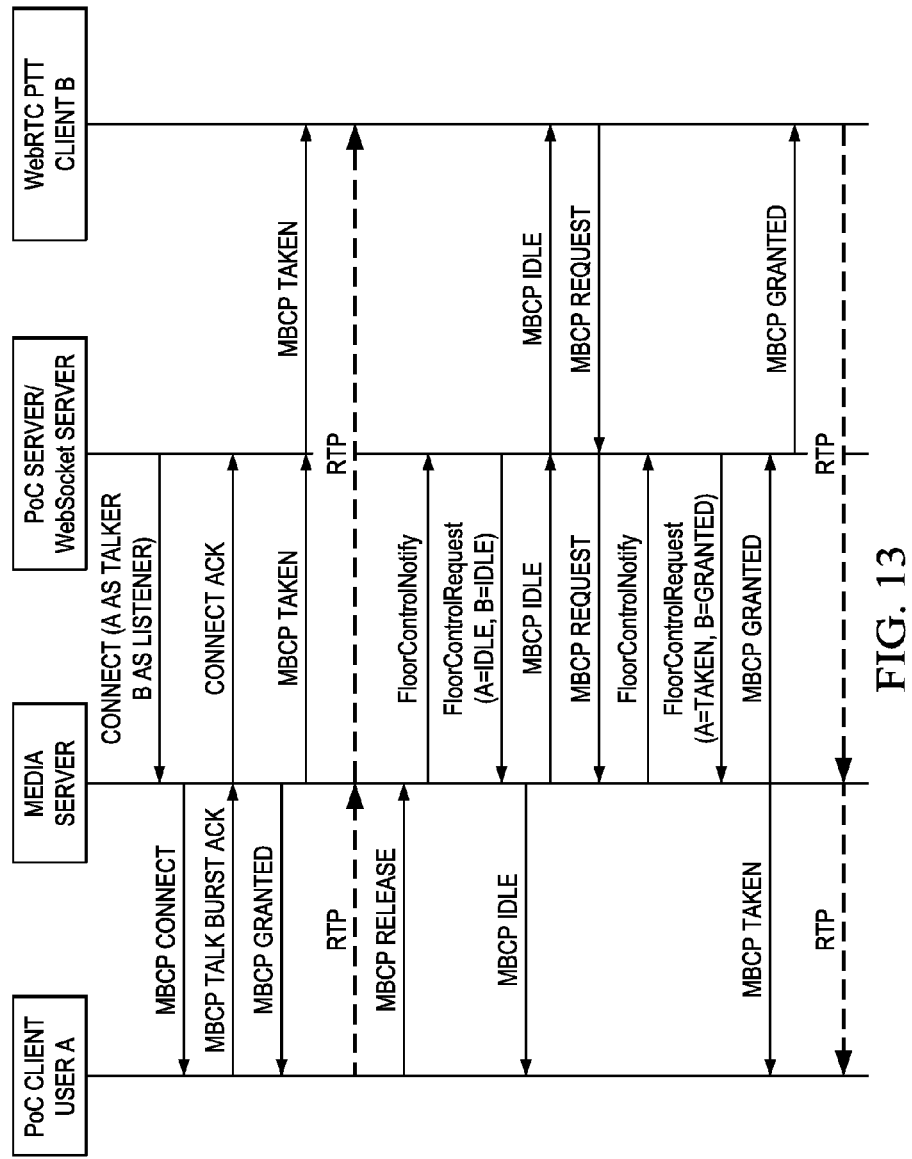
FIG. 13 illustrates the call flow for floor control, according to one embodiment of the present invention.

1. Obtaining relayed Transport Address.
2. Call Setup (Message content is changed)
3. Create Permission and Channel binding
4. ICE Connectivity Check.
5. DTLS Handshake
6. Call Release 5.3.8 Floor Control FIG. 13 illustrates the call flow for floor control.

MBCP messages are used by the WebRTC PTT Client 148 and the PoC Server 112 to exchange floor control messages within a PTT call session. An MBCP Connect message is used for terminating an incoming PTT call session to an invited party when the invited party has auto-answer enabled. This is also used for connecting the calling party to the call when at least one of the called parties accepts and/or would auto-answer the call. Similarly, an MBCP Disconnect message is used for disconnecting the calling and called parties.

In case of a WebRTC PTT Client 148, the MBCP messages are transmitted using one of the following methods:

1. In a first method, the WebSocket Server 302 encodes the MBCP messages into a base 64 format and encapsulates them into SIP messages, which it transmits over the WebSocket connection.
2. In a second method, the WebSocket Server 302 transmits the MBCP messages in a binary format over the WebSocket binary data channel.
3. In a third method, the Media Server 114 transmit the MBCP messages in a binary format over the WebRTC data channel.

5.3.9 IPA (Instant Personal Alert), MCA (Missed Call Alert)

IPA and MCA packets use the SIP message method, and while sending messages towards the WebRTC PTT Client 148, the SIP message is required to be embedded within the WebSocket, which means the complete SIP message is the payload for the WebSocket message.

5.4 Optimizations to Improve Call Setup Time When WebRTC PTT Clients are Involved This section describes the various optimization performed to improve PTT call setup while using the WebRTC PTT Client 148.

5.4.1 WebRTC PTT Client Originating Call Without Optimization

Figure 14:
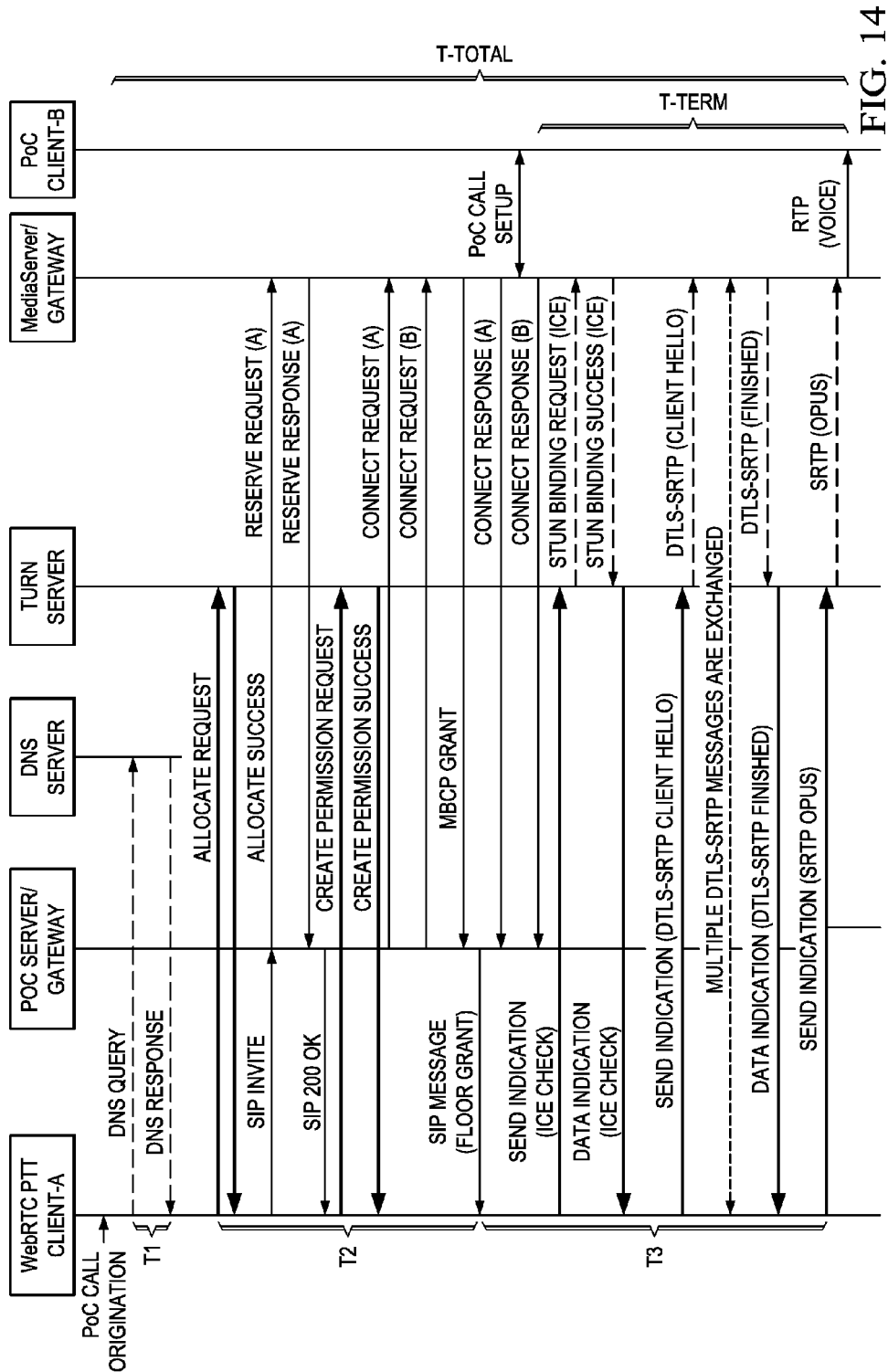
FIG. 14 illustrates the call flow for a WebRTC PTT Client originating call without optimization, according to one embodiment of the present invention.

FIG. 14 illustrates the call flow for a WebRTC PTT Client 148 originating call without optimization.

This call flow shows various delay involved in the PTT call origination over standard WebRTC (i.e. without optimization), using a 1-to-1 PTT call as an example, with the WebRTC PTT Client 148 accessing the PoC system 100 over the Internet and/or WiFi, which involves detecting and traversing through firewalls.

As shown in the call flow, the primary delays introduced at various flows are:

T1—A delay is introduced because of a DNS query to resolve the FQDNs of various components, such as the STUN/TURN/ICE Server 304.

T2—A delay is introduced because of TURN allocation, which also involves required TURN authentication setup, and followed by delay introduced to setup INVITE session.

T3—A delay is introduced because of the ICE check and transport level security as per the WebRTC standard T-total represents the overall perceptible delay for the user, from the point the PTT call origination, to the actual voice (RTP) packets received at the terminating Client 136, 148.

Figure 15:
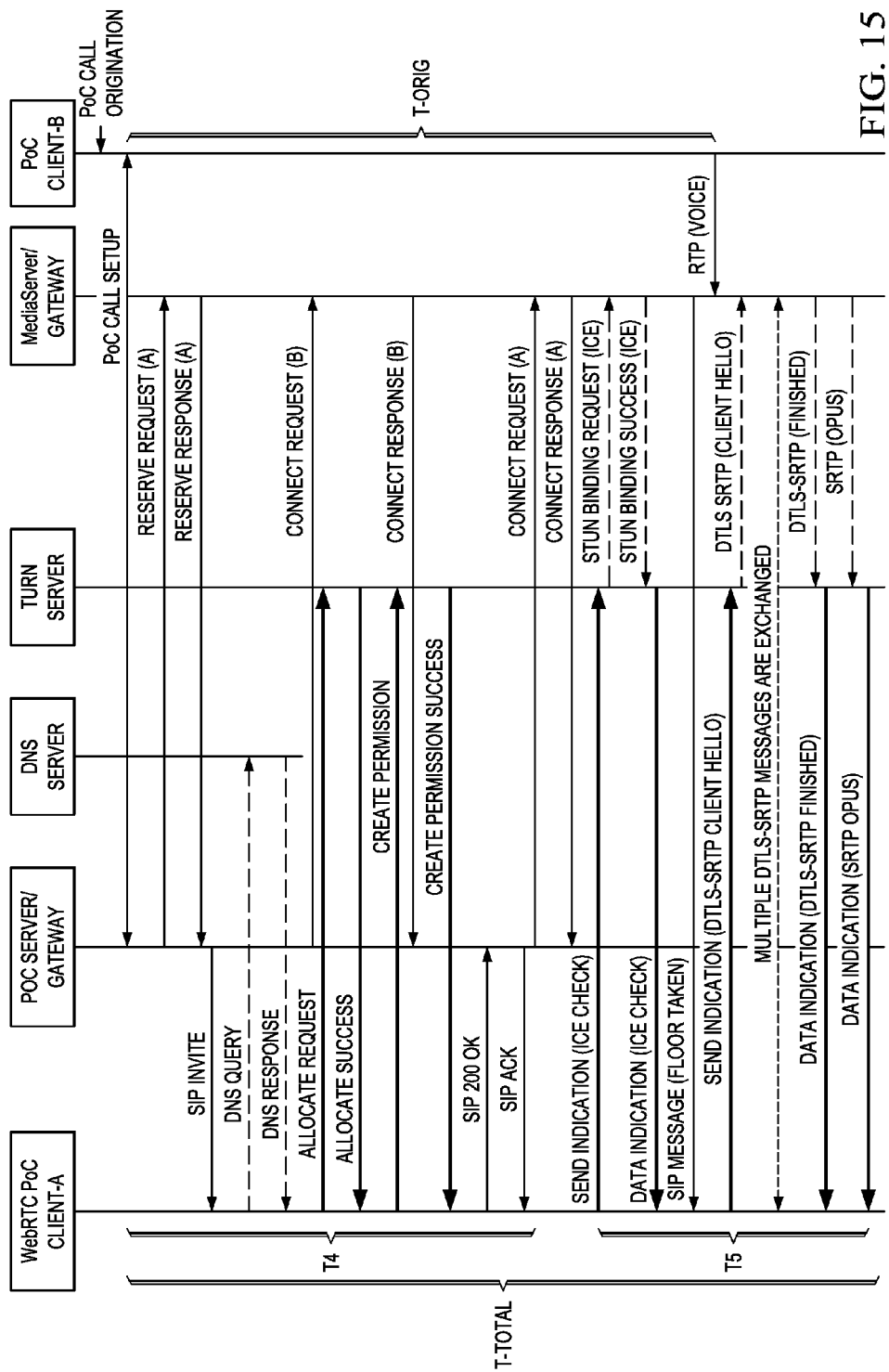
FIG. 15 illustrates the call flow for a WebRTC PTT Client receiving a PTT call over WiFi and/or Internet without optimization, according to one embodiment of the present invention.

5.4.2 WebRTC PTT Client Receiving a PTT call over WiFi and/or Internet Without Optimization FIG. 15 illustrates the call flow for a WebRTC PTT Client 148 receiving a PTT call over the IP network 146 (i.e., WiFi and/or the Internet) without optimization.

This call flow shows various delays involved in the PTT call termination over standard WebRTC (i.e., without optimization), using a 1-to-1 PTT call as an example. The WebRTC PTT Client 148 accesses the PoC system 100 over the Internet and/or WiFi, which involves detecting and traversing through firewalls.

As shown in the call flow, the primary delays introduced at various flows are:
- T-Orig—A delay is introduced in the originating PTT call by a non-WebRTC PTT Client, e.g., the PoC Client 136, which already has a pre-established PoC call session setup with the PoC Server 112.
- T4—A delay is introduced because of TURN allocation, which also involves required TURN authentication setup, and followed by a delay introduced to setup the INVITE session.
- T5—A delay is introduced because of the ICE check and transport level security as per the WebRTC standard.

5.4.3 Optimization of WebRTC for Faster PTT Call Setup

Figure 16:
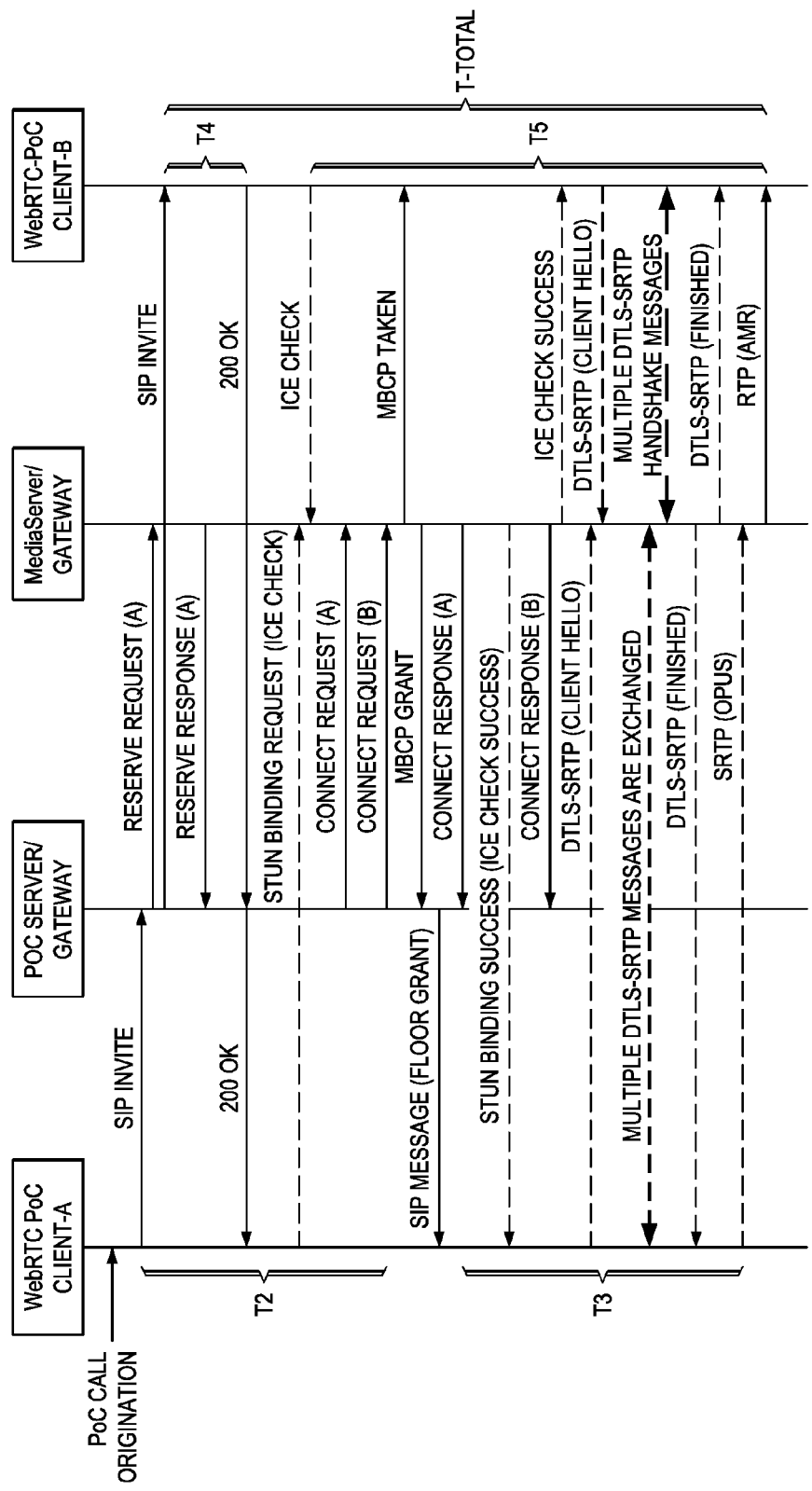
FIG. 16 illustrates the call flow for a WebRTC PTT Client initiating a PTT call to a WebRTC PTT Client with optimization, according to one embodiment of the present invention.

5.4.3.1 WebRTC PTT Client Initiating a PTT Call to WebRTC PTT Client With Optimization FIG. 16 illustrates the call flow for a WebRTC PTT Client 148 initiating a PTT call to a WebRTC PTT Client 148 with optimization.

This call flow shows various optimizations that reduce the delay involved in the PTT call termination over standard WebRTC, using a 1-to-1 PTT call as an example. The call flow shows both originating and terminating WebRTC PTT Clients 148 accessing the PoC system 100 over the IP network 146 (e.g., the Internet and/or WiFi), which involves detecting and traversing through firewalls.

Faster PTT call setup is achieved by reducing the following delays:
- The T1 delay of FIG. 14 is eliminated by keeping the DNS resolved before the PTT call origination and/or termination event.
- The T2 and T4 delays are reduced at the time of the call by pre-allocating TURN ports beforehand.

The above steps can be done during a client login or a previous origination.

Also, even though other delays T3, T5 may remain, it should be noted that these steps happen almost in parallel between originating and terminating WebRTC PTT Clients 148.

With these optimization, the overall perceptible delay to the user, i.e., T-total, is reduced and thus provides an overall faster PTT call setup experience.

Figure 17:
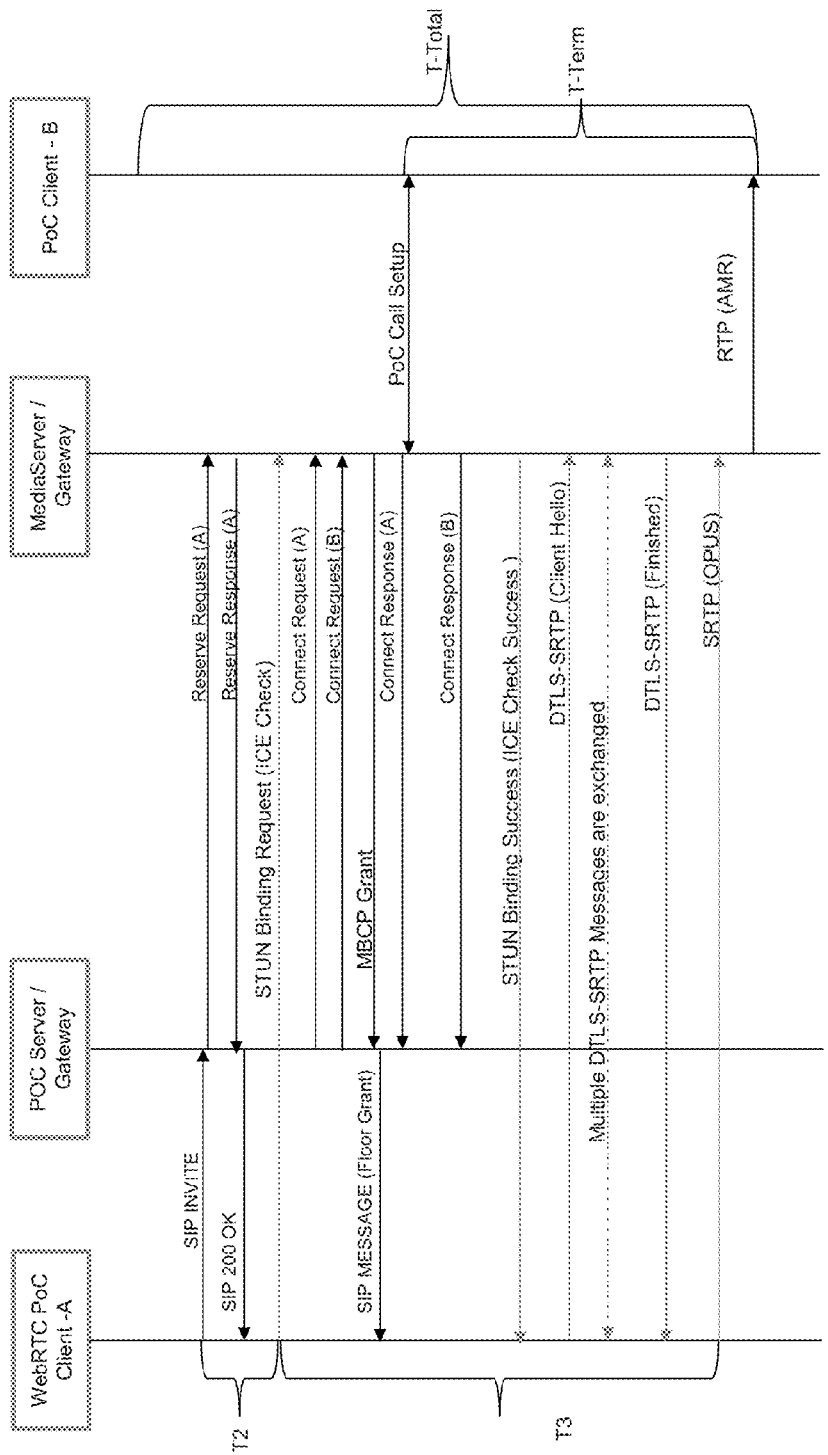
FIG. 17 illustrates the call flow for various optimizations that reduce delay involved in the PTT call termination using WebRTC over an LTE/4G access network, using a 1-to-1 call as an example, according to one embodiment of the present invention.

5.4.4 Optimization of WebRTC for Faster VII Call Setup over a 4G/LTE Network FIG. 17 illustrates the call flow for various optimizations that reduce delay involved in the PTT call termination using WebRTC over a 4G/LTE access network, using a 1-to-1 call as an example. The call flow shows an originating WebRTC PTT Client 148 accessing the PoC system 100 over LTE/4G, wherein any LTE/4G firewalls and/or routers have been configured to provide special treatment for traffic to and from the WebRTC PTT Client 148, especially as it relates to firewall idle timers.

In such cases, further optimization can be achieve by optimizing the following delays:
- The T1 delay is eliminated by keeping the DNS resolved before the PTT call origination and/or termination event.
- The T2 delays are reduced at the time of the call by pre-allocating TURN ports beforehand.

The above preparatory steps can be done during client login or during a previous origination event.

With all these optimization overall perceptible delay to the user, i.e., T-total is reduced and thus provides overall faster PTT call setup experience.

5.5 Methods for Further Optimization

This section describes various optimizations to further improve PTT call setup while using the WebRTC PTT Client 148.

5.5.1 Modified Trickle ICE

Trickle ICE is an optimization of the ICE specification for NAT traversal. Trickle ICE helps make the call setup faster by sending one or more ICE candidates as they become available without waiting for the entire candidate process to complete.

In the present invention, the Trickle ICE mechanism is further optimized. Specifically, a TURN Relay candidate is selected as the only initial candidate and the WebRTC PTT Client 148 sends a SIP INVITE immediately with relay candidate in SDP. Further, no candidate gathering is performed on the Media Server 114, except a local candidate to expedite setup time. The media path is switched subsequently when better candidates are discovered.

5.5.2 ICE Connectivity Check Optimization

In standard WebRTC, both parties involved in a call do not make any assumptions about the network topology and perform ICE connectivity check to ensure media connectivity for the call. However, in the PoC system 100, the Media Server 114 is configured with network topology awareness. Therefore, the Media Server 114 is operated in ICE-Lite mode for both Offerer/Answerer scenarios and, hence, does not initiate the connectivity check to reduce the connectivity check time; only the WebRTC PTT Client 148 initiates the connectivity check. The Media Server 114 operates in active-passive mode and responds to connectivity checks initiated by the WebRTC PTT Client 148.

5.5.3 Location-Based Candidate Selection

Exhaustive ICE candidate gathering can be bypassed by using static candidate mapping based on the current location of the WebRTC PTT Client 148, particularly when the WebRTC PTT Client 148 is located in a home network coverage area. The location of the WebRTC PTT Client 148 can be characterized by IP network subnet, WiFi network SSID, carrier IP range, access point, GPS coordinates, cell info, and so on. The WebRTC PTT Client 148 can apply heuristic caching of a previously discovered candidate pair that was reachable and use it for subsequent calling.

5.6 Standards References

This invention refers to the following standards, all of which are incorporated by reference herein:
1. SIP—Session Initiation Protocol (www.tools.ietf.org/html/rfc3261).
2. SDP—Session Description Protocol (www.tools.ietf.org/html/rfc4566)
3. RTP/RTCP—A Transport Protocol for Real-Time Applications (www.tools.ietforg/html/rfc3550)

4. Opus codec information (www.tools.ietf.org/id/draft-spittka-payload-rtp-opus-03.txt)
5. TURN (RFC 5766) (www.tools.ietf.org/html/rfc5766)
6. STUN (RFC 3489) (www.tools.ietf.org/html/rfc5389)
7. ICE (RFC 5245) (www.tools.ietf.org/html/rfc5245)
8. WebSocket (RFC 6455) (www.tools.ietf.org/html/rfc6455)

6. Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a communications network, the system comprising:
one or more servers that interface to the communications network to provide communications services for a plurality of user devices, wherein the communications services comprise a Push-To-Talk (PTT) call session;
wherein the one or more servers and the plurality of user devices communicate with each other using control messages within the communications network, and a first server of the one or more servers switches media streams comprising voice messages for the communications services between the plurality of user devices across the communications network, wherein one or more ports of the first server are pre-allocated before the PTT call session is setup; and
wherein a first user device of the plurality of user devices communicates with the first server during the PTT call session using a Web Real-Time Communication (WebRTC) connection, and at least the media streams of the PTT call session are transmitted between the first user device and the first server using the Web RTC connection, wherein the first user device implements a PTT call set up procedure based on a Trickle Interactive Connectivity Establishment (ICE) method, wherein the PTT call set up procedure uses a Traversal Using Relay NAT (Network Address Translation) (TURN) server as an initial candidate and proceed with an initial PTT call setup without waiting for a candidate gathering process to complete.

2. The system of claim 1, wherein the first server manages the PTT call session by acting as an arbitrator for the PTT call session and by controlling transmission of the control messages and the media streams for the PTT call session.

3. The system of claim 1, wherein the control messages comprise Session Initiation Protocol (SIP) messages.

4. The system of claim 3, wherein the SIP messages are sent over WebSockets connections.

5. The system of claim 4, wherein the WebSockets connections are persistent connections between the first user device and the first server.

6. The system of claim 3, wherein the SIP messages comprise WebRTC session negotiation information in a Session Description Protocol (SDP) format.

7. The system of claim 3, wherein Media Burst Control Protocol (MBCP) messages are encoded into a base 64 format and then encapsulated within the SIP messages as floor control messages for the PTT call session.

8. The system of claim 7, wherein the SIP messages bearing the MBCP messages are transmitted over a WebSocket Secure (WSS) connection.

9. The system of claim 8, wherein the MBCP messages are transmitted as binary data over the WSS connection.

10. The system of claim 1, wherein Media Burst Control Protocol (MBCP) messages are transmitted over a WebRTC Data Channel as floor control messages for the PTT call session.

11. The system of claim 1, wherein the voice messages comprise Real-time Transport Protocol (RTP) messages.

12. The system of claim 1, wherein a Domain Name Server (DNS) lookup of the first server is resolved by the first user device before the PTT call session is setup.

13. The system of claim 1, wherein the first user device transmits periodic 'keep alive' messages to keep ports at a network firewall open between the first user device and the pre-allocated ports at the first server.

14. The system of claim 1, wherein a Traversal Using Relay NAT (Network Address Translation) (TURN) protocol is used for pre-allocation of the one or more ports of the first server before the PTT call session is setup.

15. The system of claim 1, wherein the at first user device uses a first media path before the candidate gathering process is complete, wherein the first user device uses a second media path once the candidate gathering process is complete, and wherein the second media path is more efficient than the first media path.

16. The system of claim 1, setting up the PTT call session comprises using network topology awareness to run the first server in an Interactive Connectivity Establishment (ICE)-lite mode without an ICE connectivity check.

17. The system of claim 1, wherein the first user device bypasses an exhaustive Interactive Connectivity Establishment (ICE) candidate gathering by using static candidate mapping based on a current location of the first user device.

18. The system of claim 17, wherein the first user device applies heuristic caching of previously discovered candidate pairs reachable from the current location of the first user device for subsequent use when operating at the current location of the first user device.

19. The system of claim 17, wherein the first user device identifies the current location of the first user device using global positioning satellite (GPS) co-ordinates, Internet Protocol (IP) network subnet identifier, WiFi network Service Set Identifier (SSID), cell identifier, or a combination thereof.

20. A method of providing communications services in a communications network, the method comprising:
interfacing, by one or more servers, with the communications network to provide communications services for a plurality of user devices, wherein the communications services comprise a Push-To-Talk (PTT) call session;
switching, by a first server of the one or more servers, media streams comprising voice messages for the communications services between the plurality of user devices across the communications network, wherein one or more ports of the first server are pre-allocated before the PTT call session is setup, wherein the one or more servers and the plurality of user devices communicate with each other using control messages within the communications network; and
communicating, by the one or more servers, with at least a first user device of the plurality of user devices during the PTT call session using a Web Real-Time Communication (WebRTC) connection, wherein at least the media streams for the PTT call session are transmitted between the first user device and the one of the servers using the WebRTC connection, wherein the first user device implements a PTT call set up procedure based on a Trickle Interactive Connectivity Establishment (ICE) method, wherein the PTT call set up procedure uses a Traversal Using Relay NAT (Network Address Translation) (TURN) server as an initial candidate and proceed with an initial PTT call setup without waiting for a candidate gathering process to complete.

* * * * *